United States Patent
Wachi

(10) Patent No.: US 8,357,235 B2
(45) Date of Patent: Jan. 22, 2013

(54) INKJET INK COMPOSITION AND INKJET RECORDING METHOD

(75) Inventor: Naotaka Wachi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 399 days.

(21) Appl. No.: 12/731,161

(22) Filed: Mar. 25, 2010

(65) Prior Publication Data

US 2010/0242791 A1    Sep. 30, 2010

(30) Foreign Application Priority Data

Mar. 26, 2009  (JP) ................................. 2009-077244
Mar. 15, 2010  (JP) ................................. 2010-058203

(51) Int. Cl.
*C09D 11/02*    (2006.01)

(52) U.S. Cl. ................. 106/31.46; 106/31.48; 106/31.5; 106/31.52

(58) Field of Classification Search ............... 106/31.46, 106/31.48, 31.5, 31.52
See application file for complete search history.

(56) References Cited

U.S. PATENT DOCUMENTS

| | | | |
|---|---|---|---|
| 7,083,668 B2* | 8/2006 | Taguchi et al. ............. | 106/31.46 |
| 7,404,851 B2* | 7/2008 | Arai ........................... | 106/31.48 |
| 8,025,722 B2* | 9/2011 | Kawabe et al. ............. | 106/31.58 |
| 8,029,612 B2* | 10/2011 | Ishii et al. ................... | 106/31.48 |
| 8,070,869 B2* | 12/2011 | Wachi et al. ................ | 106/31.5 |
| 8,070,870 B2* | 12/2011 | Wachi .......................... | 106/31.5 |
| 8,080,099 B2* | 12/2011 | Saito et al. ................... | 106/31.5 |
| 8,123,846 B2* | 2/2012 | Yamakami et al. ......... | 106/31.48 |
| 2009/0238975 A1* | 9/2009 | Yamakami et al. ......... | 106/31.48 |
| 2009/0246378 A1* | 10/2009 | Saito et al. ................... | 106/31.5 |
| 2010/0080908 A1* | 4/2010 | Wachi et al. ................ | 106/31.48 |

FOREIGN PATENT DOCUMENTS

JP    2007-204632 A    8/2007

* cited by examiner

*Primary Examiner* — Helene Klemanski
(74) *Attorney, Agent, or Firm* — SOLARIS Intellectual Property Group, PLLC

(57) ABSTRACT

An inkjet ink composition includes a sulfoxide compound, a water-soluble dye having an aromatic heterocycle in a molecule, water and a water-soluble organic solvent, wherein the sulfoxide compound has a content of from 1% by weight to less than 10% by weight, based on the total weight of the composition. An inkjet recording method includes using an inkjet printer having a silicon oxide layer or a silane coupling layer in at least part of a component with which ink is brought into contact, and ejecting an inkjet ink composition from the inkjet printer to record an image on an inkjet recording medium, wherein the inkjet ink composition contains a sulfoxide compound, a water-soluble dye, and the sulfoxide compound has a content of from 1% by weight to less than 10% by weight, based on the total weight of the composition.

10 Claims, No Drawings

INKJET INK COMPOSITION AND INKJET RECORDING METHOD

CROSS-REFERENCE TO RELATED APPLICATION

This application is based on and claims priority under 35 USC 119 from Japanese Patent Application No. 2009-77244 filed on Mar. 26, 2009 and Japanese Patent Application No. 2010-58203 filed on Mar. 15, 2010, the disclosures of which are incorporated herein by reference in its entirety.

BACKGROUND OF THE INVENTION

1. Field of the Invention

The present invention relates to an inkjet ink composition and an inkjet recording method.

2. Description of the Related Art

In recent years, along with the spread of computers, inkjet printers have been widely used not only in offices but also in homes for printing characters and images on paper sheets, films, fabrics, and so on.

Inkjet recording methods include a method of using a piezoelectric element to eject droplets under pressure, a method of thermally generating bubbles in ink to eject droplets, a method of using an ultrasonic wave, and a method of using an electrostatic force to suck and eject droplets. Examples of ink for use in such inkjet recording include water-based ink, oil-based ink and solid (fusible) ink. Among these types of ink, water-based ink is predominant for current inkjet recording, because it is relatively superior to oil-based ink and solid (fusible) ink in terms of the ability to simultaneously satisfy the requirements for production, handling, odor, safety, and so on.

Dyes for use in such inkjet recording ink are required to have: high solubility in a solvent (ink medium); the ability to provide high-density recording; good hue; high fastness to light, heat, air, water, and chemicals; the ability to provide good fixation on image-receiving materials with less blurring; high storability of ink; no toxicity; high purity; and availability at low cost.

Concerning means for solving the problems with ozone resistance and ejecting stability, Japanese Patent Application Laid-Open (JP-A) No. 2007-204632 discloses an ink composition including 10% by weight to 80% by weight of a compound having a thioether or sulfoxide moiety, a specific magenta dye, and a water-soluble organic solvent.

SUMMARY OF THE INVENTION

The present invention has been made in view of the above circumstances and provides an inkjet ink composition and an inkjet recording method with the following aspects.

A first aspect of the invention provides an inkjet ink composition comprising: a sulfoxide compound; a water-soluble dye having an aromatic heterocycle in a molecule thereof; water; and a water-soluble organic solvent, wherein a content of the sulfoxide compound is 1% by weight or more but less than 10% by weight, based on the total weight of the inkjet ink composition.

A second aspect of the invention provides an inkjet recording method comprising:

using an inkjet printer having a silicon oxide layer or a silane coupling layer in at least part of a member thereof with which ink is brought into contact; and ejecting an inkjet ink composition from the inkjet printer to record an image on an inkjet recording medium, wherein the inkjet ink composition contains a sulfoxide compound and a water-soluble dye, in which a content of the sulfoxide compound is 1% by weight or more but less than 10% by weight, based on the total weight of the inkjet ink composition.

DETAILED DESCRIPTION OF THE INVENTION

Recently, the development of various inkjet recording ink compositions to address the above problems has raised the problem of erosion or degradation of flow channels or head members in inkjet printers.

The invention has been made in view of the above problems, and an object of the invention is to provide an inkjet recording ink composition that is improved in erosion to printers.

Another object of the invention is to provide an inkjet recording method using an inkjet recording ink composition that is improved with respect to erosion in printers.

The objects of the invention described above have been solved by an inkjet ink composition, comprising: a sulfoxide compound; a water-soluble dye having an aromatic heterocycle in a molecule thereof water; and a water-soluble organic solvent, wherein a content of the sulfoxide compound is 1% by weight or more but less than 10% by weight, based on the total weight of the inkjet ink composition.

Preferably, the water-soluble dye is a dye represented by the following Formula (Y).

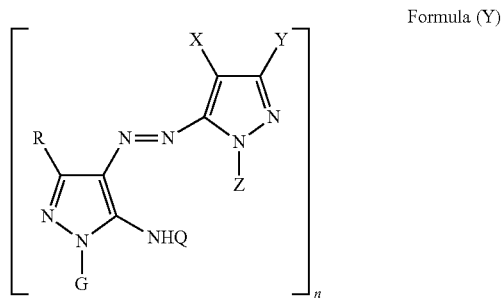

Formula (Y)

In Formula (Y), G represents a heterocyclic group; R, X, Y, Z, and Q each represent a hydrogen atom or a substituent; and n represents an integer of from 1 to 3, provided that when n is 1, R, X, Y, Z, Q, and G each represent a hydrogen atom or a monovalent substituent, when n is 2, R, X, Y, Z, Q, and G each represent a hydrogen atom, a monovalent substituent or a divalent substituent, but one of them represents a divalent substituent, and when n is 3, R, X, Y, Z, Q, and G each represent a hydrogen atom, a monovalent substituent, a divalent substituent or a trivalent substituent, but two of them each represent a divalent substituent, or one of them represents a trivalent substituent.

Preferably, the sulfoxide compound is a sulfoxide derivative of an amino acid.

Preferably, the sulfoxide compound is methionine sulfoxide.

An inkjet recording method of the present invention comprises: using an inkjet printer having a silicon oxide layer or a silane coupling layer in at least part of a component with which ink is brought into contact, and ejecting an inkjet ink composition from the inkjet printer to record an image on an inkjet recording medium, wherein the inkjet ink composition contains a sulfoxide compound, a water-soluble dye, in which a content of the sulfoxide compound is 1% by weight or more but less than 10% by weight, based on the total weight of the inkjet ink composition.

Preferably, the silane coupling layer is formed with a silane coupling agent containing a fluorine atom, and the silane coupling layer is formed on a surface of a nozzle plate of an inkjet head in the inkjet printer.

Preferably, the inkjet recording medium on which the image is recorded comprises a support and an ink-receiving layer that contains inorganic pigment particles and is formed on the support.

According to the present invention, an inkjet recording ink composition that is improved with respect to erosion in printers is provided.

According to the present invention, an inkjet recording method using an inkjet recording ink composition that is improved with respect to erosion in printers is provided.

[Inkjet Ink Composition]

The inkjet ink composition of the invention (also referred to as "an ink composition") includes a sulfoxide compound, a water-soluble dye having an aromatic heterocycle in the molecule, water, and a water-soluble organic solvent, wherein a content of the sulfoxide compound is 1% by weight or more but less than 10% by weight, based on the total weight of the ink composition.

The inkjet ink composition of the invention preferably further includes a nonionic surfactant and may include any other component as needed.

In the present invention, particularly, the content of the sulfoxide compound is 1% by weight or more but less than 10% by weight, and thereby, an inkjet ink composition that is less erosive to printers is provided.

In a case where the content of the sulfoxide compound is 10% by weight or more, ink-ejectability may be degraded, although erosion or degradation of printers will be effectively prevented. The feature that the content is 1% by weight or more means that the sulfoxide compound is intentionally added to prevent the erosion or degradation effectively. In other words, the effect of preventing erosion or degradation of printers is gradually obtained as the sulfoxide compound is added, and keeping the content in the above range makes it possible to provide an ink composition that has good ejectability and is significantly effective in preventing erosion or degradation of printers.

(Sulfoxide Compound)

The inkjet ink composition of the invention includes at least one sulfoxide compound.

The sulfoxide compound is not particularly limited as far as the compound contains a sulfoxide structure in the molecule, but preferably has at least one structure represented by the following Formula (1) in the molecule.

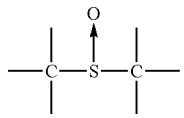

Formula (1)

The sulfoxide compound having the structure represented by Formula (1) may have a hydrophilic substituent. Examples of the hydrophilic substituent include a substituted or unsubstituted amino group, a substituted or unsubstituted carbamoyl group, a substituted or unsubstituted sulfamoyl group, a substituted or unsubstituted ammonium group, a hydroxy group, a sulfonic acid group, a carboxyl group, a phosphoric acid group, an ethyleneoxy group, and a substituted or unsubstituted nitrogen-containing heterocyclic group.

Since the ink composition of the invention is substantially based on water, the sulfoxide compound according to the invention is preferably soluble in water.

In the present invention, the sulfoxide compound more preferably has one or two structures represented by Formula (1) in the molecule.

In the present invention, a single sulfoxide compound may be used, or two or more sulfoxide compounds may be used in combination.

Specific examples of the sulfoxide compound include those shown below (Exemplary Compounds A-1 to A-52), but the present invention is not limited thereto.

A-1)

A-2)

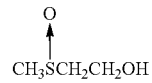

A-3)

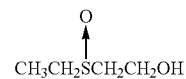

A-4)

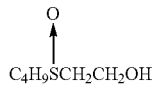

A-5)

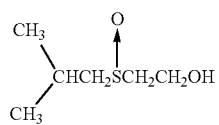

A-6)

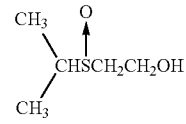

A-7)

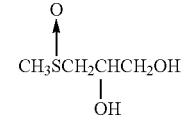

A-8)

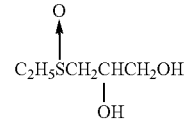

A-9)

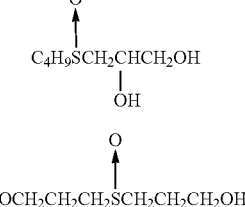

A-10)

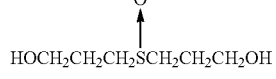

A-11)

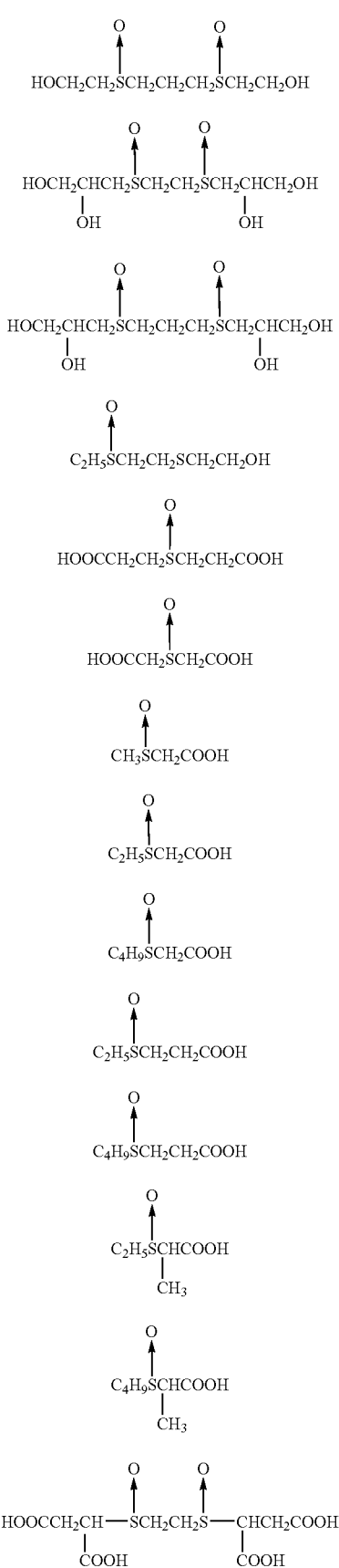
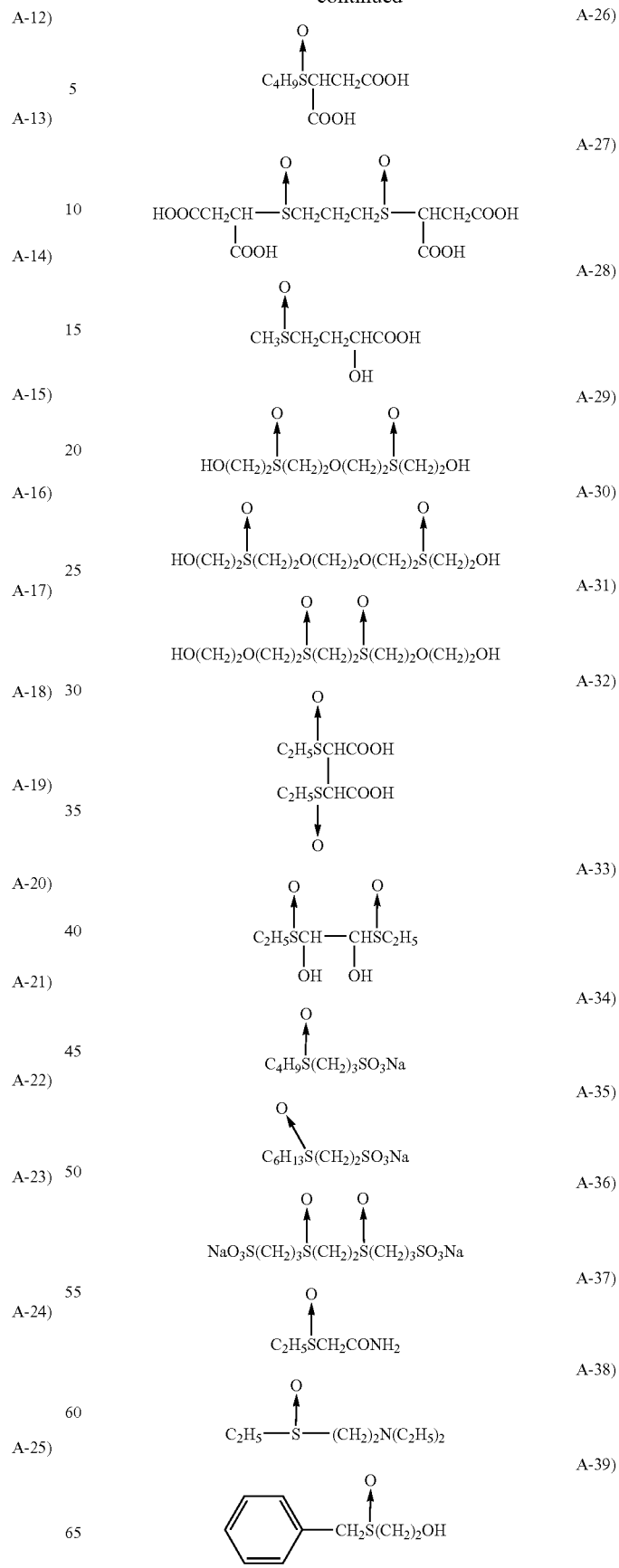

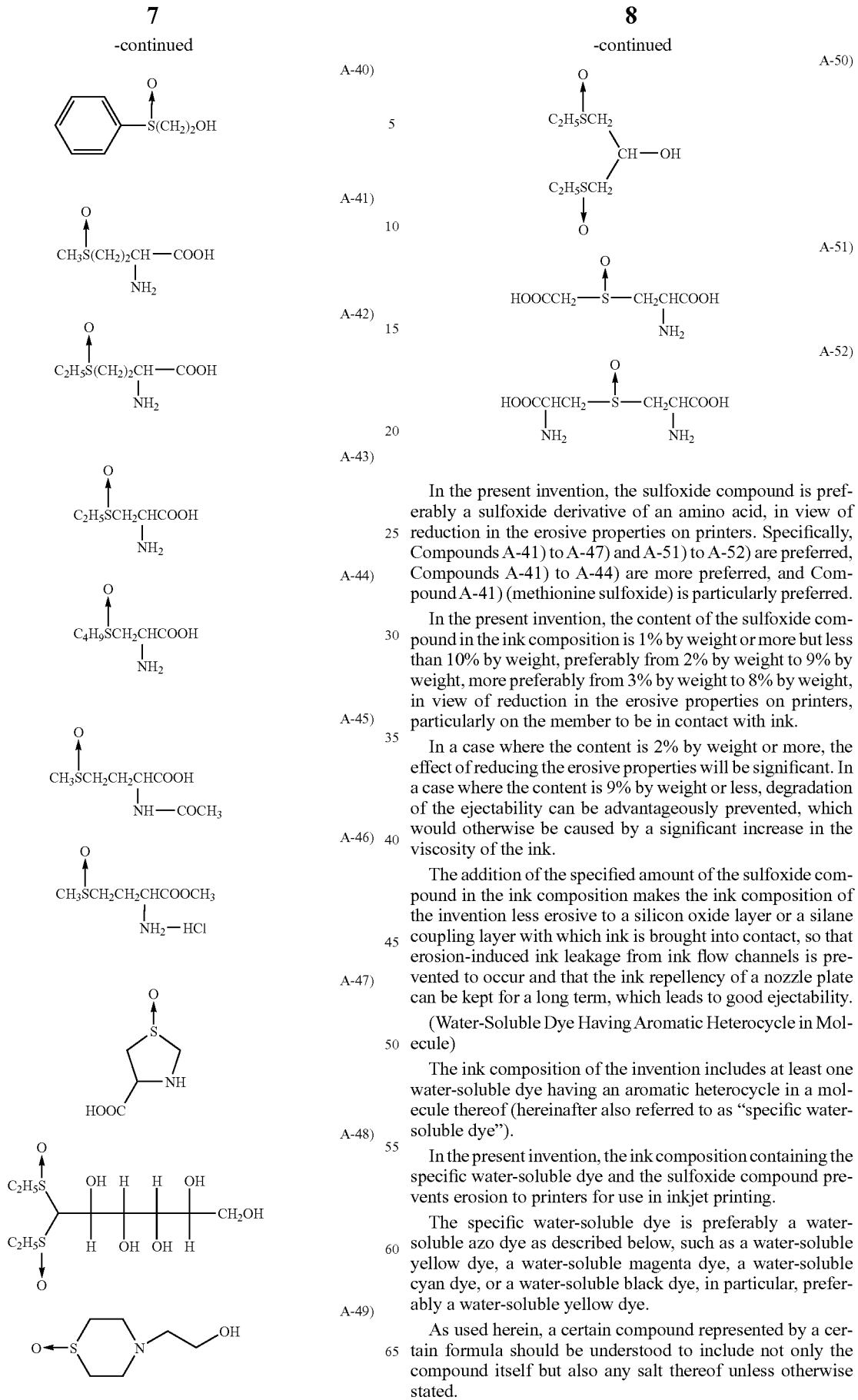

In the present invention, the sulfoxide compound is preferably a sulfoxide derivative of an amino acid, in view of reduction in the erosive properties on printers. Specifically, Compounds A-41) to A-47) and A-51) to A-52) are preferred, Compounds A-41) to A-44) are more preferred, and Compound A-41) (methionine sulfoxide) is particularly preferred.

In the present invention, the content of the sulfoxide compound in the ink composition is 1% by weight or more but less than 10% by weight, preferably from 2% by weight to 9% by weight, more preferably from 3% by weight to 8% by weight, in view of reduction in the erosive properties on printers, particularly on the member to be in contact with ink.

In a case where the content is 2% by weight or more, the effect of reducing the erosive properties will be significant. In a case where the content is 9% by weight or less, degradation of the ejectability can be advantageously prevented, which would otherwise be caused by a significant increase in the viscosity of the ink.

The addition of the specified amount of the sulfoxide compound in the ink composition makes the ink composition of the invention less erosive to a silicon oxide layer or a silane coupling layer with which ink is brought into contact, so that erosion-induced ink leakage from ink flow channels is prevented to occur and that the ink repellency of a nozzle plate can be kept for a long term, which leads to good ejectability.

(Water-Soluble Dye Having Aromatic Heterocycle in Molecule)

The ink composition of the invention includes at least one water-soluble dye having an aromatic heterocycle in a molecule thereof (hereinafter also referred to as "specific water-soluble dye").

In the present invention, the ink composition containing the specific water-soluble dye and the sulfoxide compound prevents erosion to printers for use in inkjet printing.

The specific water-soluble dye is preferably a water-soluble azo dye as described below, such as a water-soluble yellow dye, a water-soluble magenta dye, a water-soluble cyan dye, or a water-soluble black dye, in particular, preferably a water-soluble yellow dye.

As used herein, a certain compound represented by a certain formula should be understood to include not only the compound itself but also any salt thereof unless otherwise stated.

[Water-Soluble Yellow Dye]

Preferably, the water-soluble dye having an aromatic heterocycle in a molecule thereof includes at least one water-soluble azo dye selected from the group consisting a compound represented by the following Formula (Y) and a salt thereof.

The water-soluble azo dye is a yellow dye excellent in color reproducibility and fastness with respect to light, heat, moisture and active gas in the atmosphere.

Herein, the term "water-soluble" means that the azo dye is dissolved in water at a percentage of 1 g or more relative to 100 g (25° C.) of water.

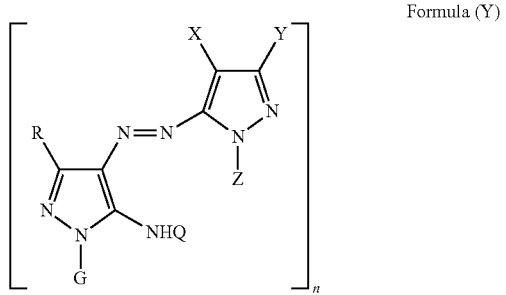

Formula (Y)

In Formula (Y), G represents a heterocyclic group; R, X, Y, Z, and Q each represent a hydrogen atom or a substituent; and n represents an integer of from 1 to 3, provided that when n is 1, R, X, Y, Z, Q, and G each represent a hydrogen atom or a monovalent substituent, when n is 2, R, X, Y, Z, Q, and G each represent a hydrogen atom, a monovalent substituent or a divalent substituent, but one of them represents a divalent substituent, and when n is 3, R, X, Y, Z, Q, and G each represent a hydrogen atom, a monovalent substituent, a divalent substituent or a trivalent substituent, but two of them each represent a divalent substituent, or one of them represents a trivalent substituent.

Formula (Y) is explained in detail below.

In Formula (Y), G is preferably a 5- to 8-membered heterocyclic group. Among these rings, 5- or 6-membered substituted, or unsubstituted aromatic or non-aromatic heterocyclic groups, which may be condensed, are preferable. Further, 5- or 6-membered aromatic heterocyclic groups having 3 to 30 carbon atoms are more preferable.

Examples of the heterocyclic group represented by the G are described below without specifying a substitution cite of the ring:

pyridine, pyrazine, pyridazine, pyrimidine, triazine, quinoline, isoquinoline, quinazoline, cinnoline, phthalazine, quinoxaline, pyrrol, indole, furan, benzofuran, thiophene, benzothiophene, pyrazole, imidazole, benzimidazole, triazole, oxazole, benzoxazole, thiazole, benzothiazole, isothiazole, benzoisothiazole, thiadiazole, isooxazole, benzoisooxazole, pyrrolidine, piperidine, piperazine, imidazolidine, thiazoline, and sulfolane.

If the heterocyclic group is able to have a substituent, further the heterocyclic group may have the following substituent.

Examples of the substituent include a straight chain or branched chain alkyl group having 1 to 12 carbon atoms, a straight chain or branched chain aralkyl group having 7 to 18 carbon atoms, a straight chain or branched chain alkenyl group having 2 to 12 carbon atoms, a straight chain or branched chain alkynyl group having 2 to 12 carbon atoms, a straight chain or branched chain cycloalkyl group having 3 to 12 carbon atoms, a straight chain or branched chain cycloalkenyl group having 3 to 12 carbon atoms (among the aforementioned groups, each of the groups having a branched chain is preferable from a reason of improvement in both solubility of dye and storage stability of ink. Groups having an asymmetric carbon atom are especially preferable. For example, methyl, ethyl, isopropy, sec-butyl, t-butyl, 2-ethylhexyl, 2-methylsulfonylethyl, 3-phenoxypropyl, trifluoromethyl, and cyclopentyl groups are exemplified), a halogen atom (for example, chlorine, bromine), an aryl group (for example, phenyl, 4-t-butylphenyl, 2,4-di-t-amylphenyl), a heterocyclic group (for example, imidazolyl, pyrazolyl, triazolyl, 2-furyl, 2-thienyl, 2-pyrimidinyl, 2-benzothiazolyl), a cyano group, a hydroxyl group, a nitro group, a carboxyl group, an amino group, an alkyloxy group (for example, methoxy, ethoxy, 2-methoxyethoxy, 2-methylsulfonylethoxy), an aryloxy group (for example, phenoxy, 2-methylphenoxy, 4-t-butylphenoxy, 3-nitrophenoxy, 3-t-butyloxycarbonylphenoxy, 3-methoxycarbonylphenoxy), an acylamino group (for example, acetoamido, benzoamido, 4-(3-t-butyl-4-hydroxyphenoxy)butane amido), an alkylamino group (for example, methylamino, butylamino, diethylamino, methylbutylamino), an acylamino group (for example, phenylamino, 2-chloroanilino), an ureido group (for example, phenylureido, methylureido, N,N-dibutylureido), a sulfamoylamino group (for example, N,N-dipropylsulfamoylamino), an alkylthio group (for example, methylthio, octylthio, 2-phenoxyethylthio), an arylthio group (for example, phenylthio, 2-butoxy-5-t-octyl phenylthio, 2-carboxylphenylthio), an alkyloxycarbonylamino group (for example, methoxycarbonylamino), an alkylsulfonylamino group and an arylsulfonylamino group (for example, methylsulfonylamino, phenylsulfonylamino, p-toluenesulfonylamino), a carbamoyl group (for example, N-ethylcarbamoyl, N,N-dibutylcarbamoyl), a sulfamoyl group (for example, N-ethylsulfamoyl, N,N-dipropylsulfamoyl, N-phenylsulfamoyl), a sulfonyl group (for example, methylsulfonyl, octylsulfonyl, phenylsulfonyl, p-toluenesulfonyl), an alkyloxycarbonyl group (for example, methoxycarbonyl, butoxycarbonyl), a heterocyclic oxy group (for example, 1-phenyltetrazole-5-oxy, 2-tetrahydropyranyloxy), an azo group (for example, phenylazo, 4-methoxyphenylazo, 4-pivaroylaminophenylazo, 2-hydroxy-4-propanoylphenylazo), an acyloxy group (for example, acetoxy), a carbamoyloxy group (for example, N-methylcarbamoyloxy, N-phenylcarbamoyloxy), a silyloxy group (for example, trimethylsilyloxy, dibutylmethylsilyloxy), an aryloxycarbonylamino group (for example, phnoxycarbonylamino), an imido group (for example, N-succinimido, N-phthalimido), a heterocyclic thio group (for example, 2-benzothiazolylthio, 2,4-diphenoxy-1,3,5-triazole-6-thio, 2-pyridylthio), a sulfinyl group (for example, 3-phenoxypropylsulfinyl), a phosphonyl group (for example, phenoxyphosphonyl, octyloxyphosphonyl, phenylphosphonyl), an aryloxycarbonyl group (for example, phenoxycarbonyl), an acyl group (for example, acetyl, 3-phenylpropanoyl, benzoyl), or ionic hydrophilic group (for example, carboxyl, sulfo, phosphono, quaterary ammonium).

In the above-described Formula (Y), preferable examples of Q, R, X, Y and Z are explained in detail below.

When n is 1, Q, R, X, Y, and Z each represent a hydrogen atom or a monovalent substituent. The monovalent substituent is detailed below. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group; an amino group which may be an alkylamino group, or an aryamino group; an acylamino group (amido), an aminocarbonylamino group (ureido), an alkoxycarbonylamino group, an aryloxycarbonylamino group, a sulfamoylamino group, an alkylsulfonylamino group, an arylsulfonylamino group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, a phosphino group, a phosphinyl group, a phosphinyloxy group, a phosphinylamino group, a silyl group, an azo group, or an imido group. Further, each of the above groups may have a substituent.

Of the monovalent group, a hydrogen atom, a halogen atom, an alkyl group, an aryl group, a heterocyclic group, a cyano group, an alkoxy group, an amido group, an ureido group, an alkylsulfonylamino group, an arylsulfonylamino group, a sulfamoyl group, an alkylsulfonyl group, an arylsulfonyl group, a carbamoyl group, or an alkoxycarbonyl group is preferable in consideration of a good storage stability with respect to moisture, oxidizing gas, light, and the like of the recorded image, and an excellent hue. Furthermore, a hydrogen atom, a halogen atom, an alkyl group, an aryl group, a cyano group, an alkylsulfonyl group, an arylsulfonyl group, or a heterocyclic group is preferable. Among these groups, a hydrogen atom, an alkyl group, an aryl group, a cyano group, or an alkylsulfonyl group is still furthermore preferable.

The above-described Q, R, X, Y, and Z are explained in more detail below.

The halogen atom represented by Q, R, X, Y, and Z represents a chlorine atom, a bromine atom, or an iodine atom. Of these atoms, a chlorine atom, or a bromine atom is preferable. A chlorine atom is furthermore preferable.

The alkyl group represented by Q, R, X, Y, and Z encompasses a substituted alkyl group and an unsubstituted alkyl group. The substituted alkyl group or unsubstituted alkyl group preferably has from 1 to 30 carbon atoms. Examples of the substituent include the same examples of the substituent as recited in a case where the aforementioned G optionally has a substituent. Among these examples, a hydroxyl group, an alkoxy group, a cyano group, a halogen atom, a sulfo group or a salt thereof or a carboxyl group or a salt thereof is preferable. Specific examples of the alkyl group include a methyl group, an ethyl group, a butyl group, a t-butyl group, n-octyl group, an eicosyl group, a 2-chloroethyl group, a hydroxyethyl group, a cyanoethyl group, and a 4-sulfobutyl group.

The cycloalkyl group represented by Q, R, X, Y, and Z encompasses a substituted or unsubstituted cycloalkyl group. The substituted or unsubstituted cycloalkyl group preferably has from 5 to 30 carbon atoms. Examples of the substituent include the same examples of the substituent as recited in a case where the aforementioned G optionally has a substituent. Specific examples of the cycloalkyl group include a cyclohexyl group, a cyclopentyl group, and a 4-n-dodecylcyclohexyl group.

The aralkyl group represented by Q, R, X, Y, and Z encompasses a substituted or unsubstituted aralkyl group. The substituted or unsubstituted aralkyl group preferably has from 7 to 30 carbon atoms. Examples of the substituent include the same examples of the substituent as recited in a case where the aforementioned G optionally has a substituent. Specific examples of the aralkyl group include a benzyl group, and a 2-phenetyl group.

The alkenyl group represented by Q, R, X, Y and Z represents a substituted or unsubstituted straight chain, branched, or cyclic alkenyl group. The alkenyl group is a substituted or unsubstituted alkenyl group preferably having 2 to 30 carbon atoms. Specific examples of the alkenyl group include a vinyl group, an allyl group, a prenyl group, a geranyl group, an oleyl group, a 2-cyclopentene-1-yl group, and a 2-cyclohexene-1-yl group.

The alkynyl group represented by Q, R, X, Y, and Z is a substituted or unsubstituted alkynyl group preferably having 2 to 30 carbon atoms. Specific examples of the alkynyl group include an ethynyl group and a propargyl group.

The aryl group represented by Q, R, X, Y, and Z is a substituted or unsubstituted aryl group preferably having 6 to 30 carbon atoms. Specific examples of the aryl group include a phenyl group, a p-toryl group, a naphthyl group, a m-chlorophenyl group, and a o-hexadecanoylaminophenyl group. Examples of the substituent include the same examples of the substituent as recited in a case where the aforementioned G optionally has a substituent.

The heterocyclic group represented by Q, R, X, Y, and Z is preferably a monovalent group derived from a substituted or unsubstituted 5- or 6-membered atomatic or nonaromatic hetero ring compound from which one hydrogen atom is removed. Further, the hetero ring may be condensed. The heterocyclic group is more preferably a 5- or 6-membered atomatic heterocyclic group having 3 to 30 carbon atoms. Examples of the substituent include the same examples of the substituent as recited in a case where the aforementioned G optionally has a substituent. Specific examples of the heterocyclic group are recited below without specifying the substitution site of the hetero ring: pyridine, pyrazine, pyridazine, pyrimidine, tiazine, quinoline, isoquinoline, quinazoline, cirmoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzoisothiazole, thiadiazole, isoxazole, benzisoxazole, pyrrolidine, piperidine, piperazine, imidazolidine, and thiazoline.

The alkoxy group represented by Q, R, X, Y, and Z encompasses a substituted or unsubstituted alkoxy group. The substituted or unsubstituted alkoxy group preferably has from 1 to 30 carbon atoms. Examples of the substituent include the same examples of the substituent as recited in a case where the aforementioned G optionally has a substituent. Specific examples of the alkoxy group include a methoxy group, an ethoxy group, a isopropoxy group, a n-octyloxy group, a methoxyethoxy group, a hydroxyethoxy group, and a 3-carboxypropoxy group.

The aryloxy group represented by Q, R, X, Y, and Z is preferably a substituted or unsubstituted aryloxy group having from 6 to 30 carbon atoms. Examples of the substituent include the same examples of the substituent as recited in a case where the aforementioned G optionally has a substituent. Specific examples of the aryloxy group include a phenoxy group, a 2-methylphenoxy group, a 4-t-butylphenoxy group, a 3-nitrophenoxy group, and a 2-tetradecanoylaminophenoxy group.

The silyloxy group represented by Q, R, X, Y, and Z is preferably a silyloxy group having from 3 to 20 carbon atoms. Specific examples of the silyloxy group include a trimethylsilyloxy group, and a t-butyldimethylsilyloxy group.

The heterocyclic oxy group represented by Q, R, X, Y, and Z is preferably a substituted or unsubstituted heterocyclic oxy group having from 2 to 30 carbon atoms. Examples of the substituent include the same examples of the substituent as recited in a case where the aforementioned G optionally has a substituent. Specific examples of the heterocyclic oxy group include a 1-phenyltetrazole-5-oxy, and 2-tetrahydropyranyloxy group.

The acyloxy group represented by Q, R, X, Y, and Z is preferably a formyloxy group, a substituted or unsubstituted allyl carbonyloxy group having from 2 to 30 carbon atoms, or a substituted or unsubstituted aryl carbonyloxy group having from 6 to 30 carbon atoms. Examples of the substituent include the same examples of the substituent as recited in a case where the aforementioned G optionally has a substituent. Specific examples of the acyloxy group include an a formyloxy group, an acetyloxy group, a pivaloyloxy group, a stearoyloxy group, a benzoyloxy group, and a p-methoxyphenylcabonyloxy group.

The carbamoyloxy group represented by Q, R, X, Y, and Z is preferably a substituted or unsubstituted carbamoyloxy group having from 1 to 30 carbon atoms. Examples of the substituent include the same examples of the substituent as recited in a case where the aforementioned G optionally has a substituent. Specific examples of the carbamoyloxy group include an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group.

The alkoxycarbonyloxy group represented by Q, R, X, Y, and Z is preferably a substituted or unsubstituted alkoxycarbonyloxy group having from 2 to 30 carbon atoms. Examples of the substituent include the same examples of the substituent as recited in a case where the aforementioned G optionally has a substituent. Specific examples of the alkoxycarbonyloxy group include a methoxycarbonyloxy group, an ethoxycarbonyloxy group, a t-butoxycarbonyloxy group, and an n-octylcarbonyloxy group.

The aryloxycarbonyloxy group represented by Q, R, X, Y, and Z is preferably a substituted or unsubstituted aryloxycarbonyloxy group having from 7 to 30 carbon atoms. Examples of the substituent include the same examples of the substituent as recited in a case where the aforementioned G optionally has a substituent. Specific examples of the aryloxycarbonyloxy group include a phenoxycarbonyloxy group, a p-methoxy phenoxycarbonyloxy group, and a p-n-hexadecyloxyphenoxycarbonyloxy group.

The amino group represented by Q, R, X, Y, and Z is preferably a substituted or unsubstituted alkylamino group having from 1 to 30 carbon atoms, and a substituted or unsubstituted arylamino group having from 6 to 30 carbon atoms. Examples of the substituent include the same examples of the substituent as recited in a case where the aforementioned G optionally has a substituent. Specific examples of the amino group include an amino group, a methylamino group, a dimethylamino group, an anilino group, an N-methylanilino group, a diphenylamino group, a hydroxyethylamino group, a carboxyethylamino group, a sulfoethylamino group, and a 3,5-dicarboxyanilino group.

The acylamino group represented by Q, R, X, Y, and Z is preferably a formylamino group, a substituted or unsubstituted alkylcarbonylamino group having from 1 to 30 carbon atoms, and a substituted or unsubstituted arylcarbonylamino group having from 6 to 30 carbon atoms. Examples of the substituent include the same examples of the substituent as recited in a case where the aforementioned G optionally has a substituent. Specific examples of the acylamino group include a formylamino group, an acetylamino group, a pivaloylamino group, a lauroylamino group, a benzoylamino group, and a 3, 4, 5-tri-n-octyloxyphenylcarbonylamino group.

The aminocarbonylamino group represented by Q, R, X, Y, and Z is preferably a substituted or unsubstituted aminocarbonylamino group having from 1 to 30 carbon atoms. Examples of the substituent include the same examples of the substituent as recited in a case where the aforementioned G optionally has a substituent. Specific examples of the aminocarbonylamino group include a carbamoylamino group, an N,N-diethylamino carbonylamino group, and a morpholinocarbonylamino group.

The alkoxycarbonylamino group represented by Q, R, X, Y, and Z is preferably a substituted or unsubstituted alkoxycarbonylamino group having from 2 to 30 carbon atoms. Examples of the substituent include the same examples of the substituent as recited in a case where the aforementioned G optionally has a substituent. Specific examples of the alkoxycarbonylamino group include a methoxycarbonylamino group, an ethoxycarbonylamino group, a t-butoxycarbonylamino group, an n-octadecyloxycarbonylamino group, and a N-methyl-methoxycarbonylamino group.

The atyloxycarbonylamino group represented by Q, R, X, Y, and Z is preferably a substituted or unsubstituted aryloxycarbonylamino group having from 7 to 30 carbon atoms. Examples of the substituent include the same examples of the substituent as recited in a case where the aforementioned G optionally has a substituent. Specific examples of the aryloxycarbonylamino group include a phenoxycarbonylamino group, a p-chlorophenoxy carbonylamino group, and a m-n-octyloxyphenoxycarbonylamino group.

The sulfamoylamino group represented by Q, R, X, Y, and Z is preferably a substituted or unsubstituted sulfamoylamino group having from 0 to 30 carbon atoms. Examples of the substituent include the same examples of the substituent as recited in a case where the aforementioned G optionally has a substituent. Specific examples of the sulfamoylamino group include a sulfamoylamino group, an N,N-dimethylaminosulfonyl amino group, and an N-n-octylaminosulfonylamino group.

The alkyl or aryl sulfonylamino group represented by Q, R, X, Y, and Z is preferably a substituted or unsubstituted allylsulfonylamino group having from 1 to 30 carbon atoms and a substituted or unsubstituted arylsulfonylamino group having from 6 to 30 carbon atoms. Examples of the substituent include the same examples of the substituent as recited in a case where the aforementioned G optionally has a substituent. Specific examples of the alkyl or arylsulfonylamino group include a methylsulfonylamino group, a butylsulfonylamino group, a phenylsulfonylamino group, a 2, 3, 5-trichlorophenylsulfonylamino group, and a p-methyl phenylsulfonylamino group.

The alkylthio group represented by Q, R, X, Y, and Z is preferably a substituted or unsubstituted alkylthio group having from 1 to 30 carbon atoms. Examples of the substituent include the same examples of the substituent as recited in a case where the aforementioned G optionally has a substituent. Specific examples of the alkylthio group include a methylthio group, an ethylthio group, and a n-hexadecylthio group.

The arylthio group represented by Q, R, X, Y, and Z is preferably a substituted or unsubstituted arylthio group having from 6 to 30 carbon atoms. Examples of the substituent include the same examples of the substituent as recited in a case where the aforementioned G optionally has a substituent. Specific examples of the arylthio group include a phenylthio group, a p-chlorophenylthio group, and an m-methoxyphenylthio group.

The heterocyclic thio group represented by Q, R, X, Y, and Z is preferably a substituted or unsubstituted heterocyclic thio group having from 2 to 30 carbon atoms. Examples of the substituent include the same examples of the substituent as recited in a case where the aforementioned G optionally has a substituent. Specific examples of the heterocyclic thio group include a 2-benzothiazolylthio group, and a 1-phenyltetrazole-5-ylthio group.

The sulfamoyl group represented by Q, R, X, Y, and Z is preferably a substituted or unsubstituted sulfamoyl group having from 0 to 30 carbon atoms. Examples of the substituent include the same examples of the substituent as recited in a case where the aforementioned G optionally has a substituent. Specific examples of the sulfamoyl group include an N-ethylsulfamoyl group, an N-(3-dodecyloxypropyl)sulfamoyl group, a N,N-dimethyl sulfamoyl and an N-acetylsulfamoyl group, a N-benzoylsulfamoyl group, and a N-(N'-phenylcarbamoyl)sulfamoyl group.

The allyl or aryl sulfinyl group represented by Q, R, X, Y, and Z is preferably a substituted or unsubstituted alkylsulfinyl group having from 1 to 30 carbon atoms, or a substituted or unsubstituted arylsulfinyl group having from 6 to 30 carbon atoms. Examples of the substituent include the same examples of the substituent as recited in a case where the aforementioned G optionally has a substituent. Specific examples of the alkyl or aryl sulfinyl group include a methylsulfinyl group, an ethylsulfinyl group, a phenylsulfinyl group, and a p-methlphenylsulfinyl group.

The alkyl or aryl sulfonyl group represented by Q, R, X, Y, and Z is preferably a substituted or unsubstituted alkylsulfonyl group having from 1 to 30 carbon atoms, or a substituted or unsubstituted arylsulfonyl group having from 6 to 30 carbon atoms. Examples of the substituent include the same examples of the substituent as recited in a case where the aforementioned G optionally has a substituent. Specific examples of the alkyl or aryl sulfonyl group include a methylsulfonyl group, an ethylsulfonyl group, a phenylsulfonyl group, and a p-toluene sulfonyl group.

The acyl group represented by Q, R, X, Y, and Z is preferably a formyl group, a substituted or unsubstituted alkylcarbonyl group having from 2 to 30 carbon atoms, a substituted or unsubstituted arylcarbonyl group having from 7 to 30 carbon atoms, or a substituted or unsubstituted heterocyclic carbonyl group having from 4 to 30 carbon atoms wherein the carbonyl group bonds to a carbon atom of the hetero ring. Examples of the substituent include the same examples of the substituent as recited in a case where the aforementioned G optionally has a substituent. Specific examples of the acyl group include an acetyl group, a pivaloyl group, a 2-chloroacetyl group, a stearoyl group, a benzoyl group, a p-n-octyloxyphenylcarbonyl group, a 2-pyridyl carbonyl group, and a 2-furylcarbonyl group.

The aryloxycarbonyl group represented by Q, R, X, Y, and Z is preferably a substituted or unsubstituted aryloxycarbonyl group having from 7 to 30 carbon atoms. Examples of the substituent include the same examples of the substituent as recited in a case where the aforementioned G optionally has a substituent. Specific examples of the aryloxycarbonyl group include a phenoxycarbonyl group, an o-chlorophenoxy carbonyl group, a m-nitrophenoxycarbonyl group, and a p-t-butylphenoxycarbonyl group.

The alkoxycarbonyl group represented by Q, R, X, Y, and Z is preferably a substituted or unsubstituted alkoxycarbonyl group having from 2 to 30 carbon atoms. Examples of the substituent include the same examples of the substituent as recited in a case where the aforementioned G optionally has a substituent. Specific examples of the alkoxycarbonyl group include a methoxycarbonyl group, an ethoxycarbonyl group, a t-butoxycarbonyl group, and an n-octadecyloxycarbonyl group.

The carbamoyl group represented by Q, R, X, Y, and Z is preferably a substituted or unsubstituted carbamoyl group having from 1 to 30 carbon atoms. Examples of the substituent include the same examples of the substituent as recited in a case where the aforementioned G optionally has a substituent. Specific examples of the carbamoyl group include a carbamoyl group, an N-methylcarbamoyl group, an N,N-dimethylcarbamoyl group, an N,N-di-n-octylcarbamoy group, and an N-(methylsulfonyl)carbamoyl group.

The phosphino group represented by Q, R, X, Y, and Z is preferably a substituted or unsubstituted phosphino group having from 2 to 30 carbon atoms. Examples of the substituent include the same examples of the substituent as recited in a case where the aforementioned G optionally has a substituent. Specific examples of the phosphino group include a dimethylphosphino group, a diphenylphosphino group, and a methylphenoxyphosphino group.

The phosphinyl group represented by Q, R, X, Y, and Z is preferably a substituted or unsubstituted phosphinyl group having from 2 to 30 carbon atoms. Examples of the substituent include the same examples of the substituent as recited in a case where the aforementioned G optionally has a substituent. Specific examples of the phosphinyl group include a phosphinyl group, a dioctyloxyphosphinyl group, and a diethoxyphosphinyl group.

The phosphinyloxy group represented by Q, R, X, Y, and Z is preferably a substituted or unsubstituted phosphinyloxy group having from 2 to 30 carbon atoms. Examples of the substituent include the same examples of the substituent as recited in a case where the aforementioned G optionally has a substituent. Specific examples of the phosphinyloxy group include a diphenoxyphosphinyloxy group, and a dioctyloxyphosphinyloxy group.

The phosphinylamino group represented by Q, R, X, Y, and Z is preferably a substituted or unsubstituted phosphinylamino group having from 2 to 30 carbon atoms. Examples of the substituent include the same examples of the substituent as recited in a else where the aforementioned G optionally has a substituent. Specific examples of the phosphinylamino group include a dimethoxyphosphinylamino group, and a dimethylamino phosphinylamino group.

The silyl group represented by Q, R, X, Y, and Z is preferably a substituted or unsubstituted silyl group having from 3 to 30 carbon atoms. Examples of the substituent include the same examples of the substituent as recited in a case where the aforementioned G optionally has a substituent. Specific examples of the silyl group include a trimethylsilyl group, a t-butyldimethylsilyl group, and a phenyldimethylsilyl group.

Examples of the azo group represented by Q, R, X, Y, and Z include a phenylazo group, a 4-methoxyphenylazo group, a 4-pivaloylaminophenylazo group, and a 2-hydroxy-4-propanoylphenylazo group.

Examples of the imino group represented by Q, R, X, Y, and Z include a N-succinimido group, and a N-phthalimido group.

When Q, R, X, Y and Z represent a divalent substituent, it is preferable that the divalent substituent is an alkylene group (for example, methylene, ethylene, propylene, butylene, pentylene), an alkenylene group (for example, ethenylene, propenylene), an alkynylene group (for example, ethynylene, propynylene), an arylene group (for example, phenylene, naphthylene), a divalent heterocyclic group (for example, 6-chloro-1,3,5-triazine-2,4-diyl, pyrimidine-2,4-aryl, pyrimidine-2,6-diyl, quinoxaline-2,3-diyl, pyridazine-3,6-diyl), —O—, —CO—, —NR'— wherein R' represents a hydrogen atom, an alkyl group, or an aryl group, —S—, —SO$_2$—, —SO—, or a combination thereof (for example, —NHCH$_2$CH$_2$NH—, —NHCONH—).

Each of the alkylene group, an alkenylene group, the allynylene group, the arylene group, the divalent heterocyclic group, and the alkyl group, or aryl group of R may have a substituent. Examples of the substituent include the same as those recited in the aforementioned G.

The alkyl group and the aryl group of R' each have the same meanings as those recited in the aforementioned G.

As the divalent group, an alkylene group having 10 or less carbon atoms, an alkenylene group having 10 or less carbon atoms, an alkynylene group having 10 or less carbon atoms, an arylene group having 6 to 10 carbon atoms, a divalent heterocyclic group, —S—, —SO—, —SO$_2$—, or a combination thereof (for example, —SCH$_2$CH$_2$S—, —SCH$_2$CH$_2$CH$_2$S—) are more preferable.

A total carbon atom number of the divalent connecting group is preferably from 0 to 50, more preferably from 0 to 30, and further preferably from 0 to 10.

When Q, R, X, Y, and Z represent a trivalent substituent, it is preferable that the trivalent substituent is a trivalent hydrocarbon group, a trivalent heterocyclic group, >N—, or a combination with a divalent group (for example, >NCH$_2$CH$_2$NH—, >NCONH—).

A total carbon atom number of the trivalent connecting group is preferably from 0 to 50, more preferably from 0 to 30, and further preferably from 0 to 10.

In Formula (Y), n is preferably 1 or 2, and more preferably 2.

In Formula (Y), a preferable example of the substituent represented by X is an electron withdrawing group, especially having a Hammett substituent constant σ p of 0.20 or more, and more preferably 0.30 or more. The upper limit of the σ p value of the electron withdrawing group is preferably 1.0.

Specific examples of X, especially the electron withdrawing group having the σ p value of 0.20 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with other electron withdrawing group(s) having the σ p value of 020 or more, a heterocyclic group, a halogen atom, an azo group, and a selenocyanate group.

Preferable examples of X include an acyl group having 2 to 12 carbon atoms, an acyloxy group having 2 to 12 carbon atoms, a carbamoyl group having 1 to 12 carbon atoms, an alkyloxycarbonyl group having 2 to 12 carbon atoms, an aryloxycarbonyl group having 7 to 18 carbon atoms, a cyano group, a nitro group, an alkylsulfinyl group having 1 to 12 carbon atoms, an arylsulfinyl group having 6 to 18 carbon atoms, an alkylsulfonyl group having 1 to 12 carbon atoms, an arylsulfonyl group having 6 to 18 carbon atoms, a sulfamoyl group having 0 to 12 carbon atoms, a halogenated alkyl group having 1 to 12 carbon atoms, a halogenated alkoxy group having 1 to 12 carbon atoms, a halogenated alkylthio group having 1 to 12 carbon atoms, a halogenated aryloxy group having 7 to 18 carbon atoms, an aryl group having 7 to 18 carbon atoms and substituted with at least two other electron withdrawing groups having the σ p value of 020 or more, and a N, O, or S-containing 5 to 8-membered heterocyclic group having 1 to 18 carbon atoms.

X is more preferably a cyano group, an alkylsulfonyl group having 1 to 12 carbon atoms, an arylsulfonyl group having 6 to 18 carbon atoms, or a sulfamoyl group having 0 to 12 carbon atoms.

X is further preferably a cyano group, an alkylsulfonyl group having 1 to 12 carbon atoms, or a sulfamoyl group having 0 to 12 carbon atoms. Still further preferable X is a cyano group, or an alkylsulfonyl group having 1 to 12 carbon atoms.

In Formula (Y), preferable examples of Z include a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, and a substituted or unsubstituted heterocyclic group.

Details of the group represented by Z are the same as those exemplified as the substituent on the heterocyclic group represented by C, and preferable examples of Z are also the same as those of the substituent on the heterocyclic group.

Z is especially preferably a substituted aryl group, and a substituted heterocyclic group, and furthermore preferably a substituted aryl group.

In Formula (Y), Q is preferably a hydrogen atom, a substituted or unsubstituted alkyl group, a substituted or unsubstituted acyl group, a substituted or unsubstituted alkylsulfonyl group, or a substituted or unsubstituted arylsulfonyl group, more preferably a hydrogen atom, a substituted or unsubstituted alkyl group, or a substituted or unsubstituted acyl group, and furthermore preferably a hydrogen atom.

In Formula (Y), R is preferably a substituted or unsubstituted alkyl group having total carbon atoms 1 of 1 to 12, a substituted or unsubstituted aryl group having total carbon atoms of 6 to 18, or a substituted or unsubstituted heterocyclic group having total carbon atoms of 4 to 12, more preferably a straight chain or branched alkyl group having total carbon atoms of 1 to 8, furthermore preferably a secondary or tertiary alkyl group, and still further preferably a t-butyl group.

In Formula (Y), Y is preferably a hydrogen atom, a substituted or unsubstituted alkyl group having total carbon atoms of 1 to 12, a substituted or unsubstituted aryl group having total carbon atoms of 6 to 18, or a substituted or unsubstituted heterocyclic group having total carbon atoms of 4 to 12, more preferably a hydrogen atom, or a straight chain or branched alkyl group having total carbon atoms of 1 to 8, further preferably a hydrogen atom, or an alkyl group having total carbon atoms of 1 to 8, and still further preferably a hydrogen atom.

As a preferable combination of G, R, X, Y, Z and Q in the dye represented by Formula (Y), compounds in which at least one of G, R, X, Y, Z and Q is an aforementioned preferable group are preferable, and compounds in which two or more of G, R, X, Y, Z and Q are each an aforementioned preferable group are more preferable. Compounds in which all of G, R, X, Y, Z and Q are aforementioned preferable groups are most preferable.

Especially preferable combinations of G, R, X, Y, Z and Q in the dye represented by Formula (Y) include the following exemplary embodiments of (i) to (vii):

(i) G is preferably a 5- to 8-membered nitrogen-containing hetero ring, more preferably a S-triazine, pyrimidine, pyridazine, pyrazine, pyridine, imidazole, pyrazole, or pyrrol ring, further preferably a S-triazine, pyrimidine, pyridazine, pyrazole, or pyrrol ring, and still further preferably a S-triazine ring.

(ii) R is preferably a substituted or unsubstituted alkyl group having total carbon atoms 1 of 1 to 12, a substituted or unsubstituted aryl group having total carbon atoms of 6 to 18, or a substituted or unsubstituted heterocyclic group having total carbon atoms of 4 to 12, more preferably a straight chain or branched alkyl group having total carbon atoms of 1 to 8, further preferably a secondary or tertiary alkyl group, and still further preferably a t-butyl group.

(iii) X is especially preferably a cyano group, an alkylsulfonyl group having total carbon atoms of 1 to 12, an arylsulfonyl group having total carbon atoms of 6 to 18, or a sulfamoyl group having total carbon atoms of 0 to 12, further preferably a cyano group, or an alkylsulfonyl group having total carbon atoms of 1 to 12, and still further preferably a cyano group.

(iv) Y is preferably a hydrogen atom, a substituted or unsubstituted alkyl group having total carbon atoms of 1 to 12, a substituted or unsubstituted aryl group having total carbon atoms of 6 to 18, or a substituted or unsubstituted heterocyclic group having total carbon atoms of 4 to 12, more preferably a hydrogen atom, a straight chain or branched alkyl group having total carbon atoms of 1 to 8, further preferably a hydrogen atom, or an alkyl group having total carbon atoms of 1 to 8, and still further preferably a hydrogen atom.

(v) Z is preferably a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, and a substituted or unsubstituted heterocyclic group, further preferably a substituted aryl group, or a substituted heterocyclic group, and still further preferably a substituted aryl group.

(vi) Q is preferably a hydrogen atom, a substituted or unsubstituted alkyl group, a substituted or unsubstituted acyl group, a substituted or unsubstituted alkylsulfonyl group, or a substituted or unsubstituted arylsulfonyl group, more preferably a hydrogen atom, a substituted or unsubstituted alkyl group, or a substituted or unsubstituted acyl group, and further preferably a hydrogen atom.

(vii) n represents an integer of from 1 to 3, preferably 1 or 2, and more preferably 2.

It is preferable that the compound represented by Formula (Y) is a compound represented by any of the following Formulae (Y-1), (Y-2), (Y-3), (Y-4) and (Y-5).

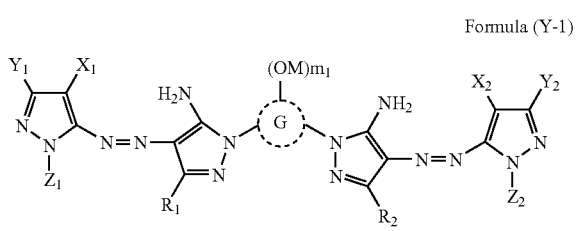

Formula (Y-1)

In Formula (Y-1), $R_1$, $R_2$, $X_1$, $X_2$, $Y_1$, $Y_2$, $Z_1$, and $Z_2$ each independently represent a monovalent group. G represents an atomic group necessary to form a 5- to 8-membered nitrogen-containing hetero ring. M represents a hydrogen atom or a cation. $m_1$ represents an integer of from 0 to 3.

Examples of G include the same as those recited in G of the aforementioned Formula (Y). Examples of the monovalent group represented by $R_1$, $R_2$, $X_1$, $X_2$, $Y_1$, $Y_2$, $Z_1$ and $Z_2$ include the same as those recited in Q, R, X, Y and Z of Formula (Y).

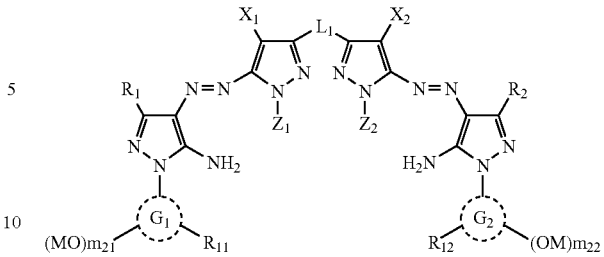

Formula (Y-2)

In Formula (Y-2), $R_1$, $R_2$, $R_{11}$, $R_{12}$, $X_1$, $X_2$, $Z_1$ and $Z_2$ each independently represent a monovalent group. $L_1$ represents a divalent connecting group. $G_1$ and $G_2$ each independently represent an atomic group necessary to form a 5- to 8-membered nitrogen-containing hetero ring. M represents a hydrogen atom or a cation. $m_{21}$ and $m_{22}$ each independently represent an integer of from 0 to 3.

Examples of $G_1$ and $G_2$ include the same as those recited in G of Formula (Y). Examples of the monovalent group represented by $R_1$, $R_2$, $R_{11}$, $R_{12}$, $X_1$, $X_2$, $Z_1$ and $Z_2$ include the same as those recited in Q, R, X, Y and Z of Formula (Y). Examples of the divalent group represented by $L_1$ include the same as those recited when Q, R, X, Y and Z of Formula (Y) represent a divalent group.

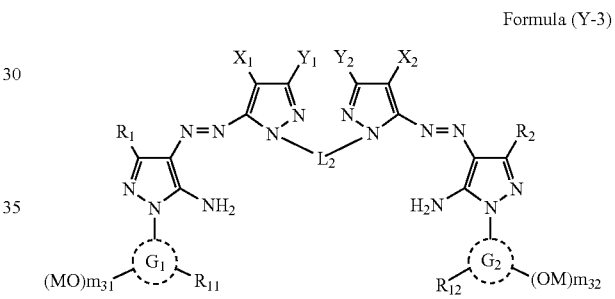

Formula (Y-3)

In Formula (Y-3), $R_1$, $R_2$, $R_{11}$, $R_{12}$, $X_1$, $X_2$, $Y_1$, and $Y_2$ each independently represent a monovalent group. $L_2$ represents a divalent connecting group. $G_1$ and $G_2$ each independently represent an atomic group necessary to form a 5- to 8-membered nitrogen-containing hetero ring. M represents a hydrogen atom or a cation. $m_{31}$ and $m_{32}$ each independently represent an integer of from 0 to 3.

Examples of $G_1$ and $G_2$ include the same as those recited in G of Formula (Y). Examples of the monovalent group represented by $R_1$, $R_2$, $R_{11}$, $R_{12}$, $X_1$, $X_2$, $Y_1$, and $Y_2$ include the same as those recited in Q, R, X, Y and Z of Formula (Y). Examples of the divalent group represented by $L_2$ include the same as those recited when Q, R, X, Y and Z of Formula (Y) represent a divalent group.

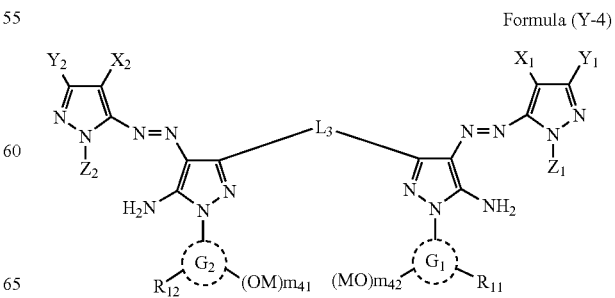

Formula (Y-4)

In Formula (Y-4), $R_{11}$, $R_{12}$, $X_1$, $X_2$, $Y_1$, $Y_2$, $Z_1$, and $Z_2$ each independently represent a monovalent group. $L_3$ represents a divalent connecting group. $G_1$ and $G_2$ each independently represent an atomic group necessary to form a 5- to 8-membered nitrogen-containing hetero ring. M represents a hydrogen atom or a cation. $m_{41}$ and $m_{42}$ each independently represent an integer of from 0 to 3.

Examples of $G_1$ and $G_2$ include the same as those recited in G of Formula (Y). Examples of the monovalent group represented by $R_{11}$, $R_{12}$, $X_1$, $X_2$, $Y_1$, $Y_2$, $Z_1$, and $Z_2$ include the same as those recited in Q, R, X, Y and Z of Formula (Y). Examples of the divalent group represented by $L_3$ include the same as those recited when Q, R, X, Y and Z of Formula (Y) represent a divalent group.

Formula (Y-5)

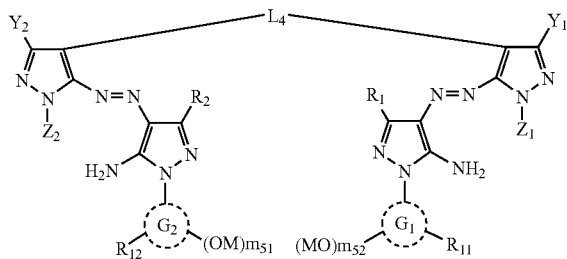

In Formula (Y-5), $R_1$, $R_2$, $R_{11}$, $R_{12}$, $Y_1$, $Y_2$, $Z_1$, and $Z_2$ each independently represent a monovalent group. $L_4$ represents a divalent connecting group. $G_1$ and $G_2$ each independently represent an atomic group necessary to form a 5- to 8-membered nitrogen-containing hetero ring. M represents a hydrogen atom or a cation. $m_{51}$ and $m_{52}$ each independently represent an integer of from 0 to 3.

Examples of $G_1$ and $G_2$ include the same as those recited in G of Formula (Y). Examples of the monovalent group represented by $R_1$, $R_2$, $R_{11}$, $R_{12}$, $Y_1$, $Y_2$, $Z_1$, and $Z_2$ include the same as those recited in Q, R, X, Y and Z of Formula (Y). Examples of the divalent group represented by $L_4$ include the same as those recited when Q, R, X, Y and Z of Formula (Y) represent a divalent group.

It is preferable that the compound represented by Formula (Y) is a compound represented by any of the following Formulae (Y-1), (Y-2), (Y-3), (Y-4) and (Y-5) in which the nitrogen-containing heterocyclic ring formed by G, $G_1$ or $G_2$ is a S-triazine ring.

Exemplified dyes DYE-1 to DEY-26 as specific examples of the compound represented by Formula (Y) are shown below. However, the dyes used in the present invention are not limited to these compounds. Further, even though the chemical structures of the following compounds are described in the form of free acids, they may be used as a salt thereof. Herein, preferable examples of the counter cation include alkali metals (for example, lithium, sodium, potassium), ammonium, and organic cations (for example, pyridinium, tetramethyl ammonium, guanidium).

DYE-1

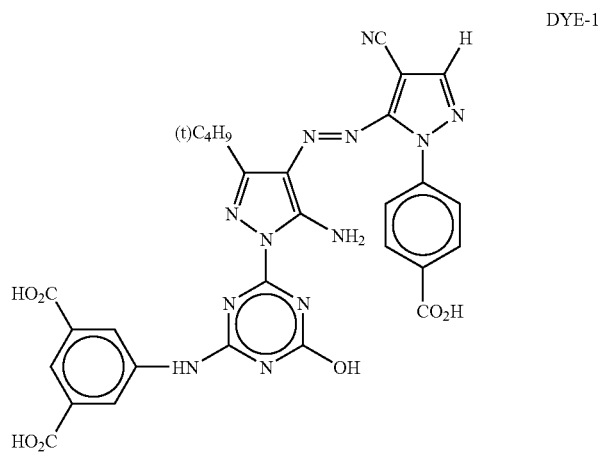

DYE-2

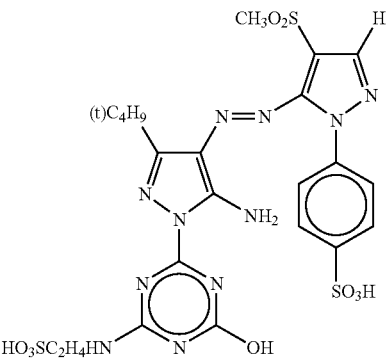

DYE-3

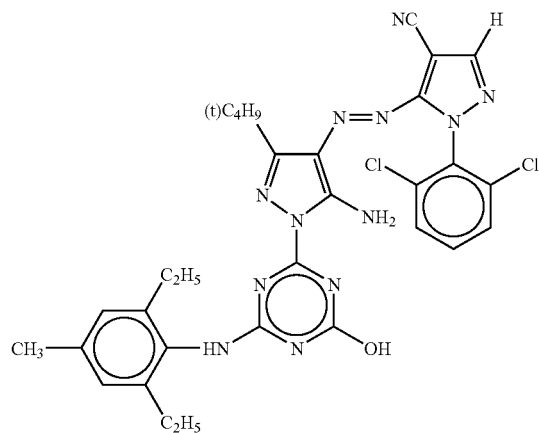

DYE-4

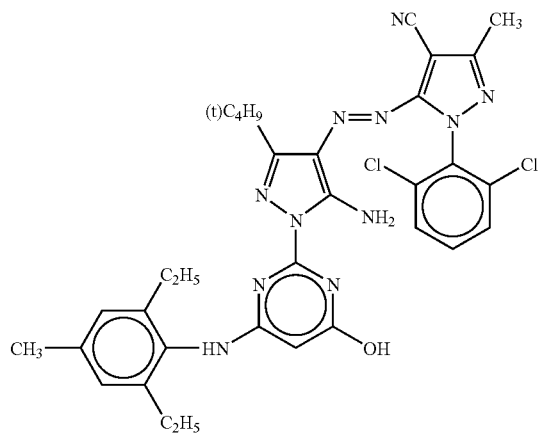

-continued
DYE-5
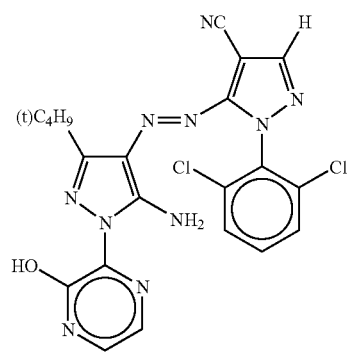
DYE-6
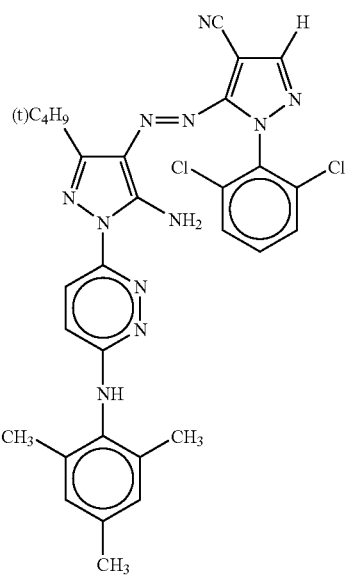
DYE-7
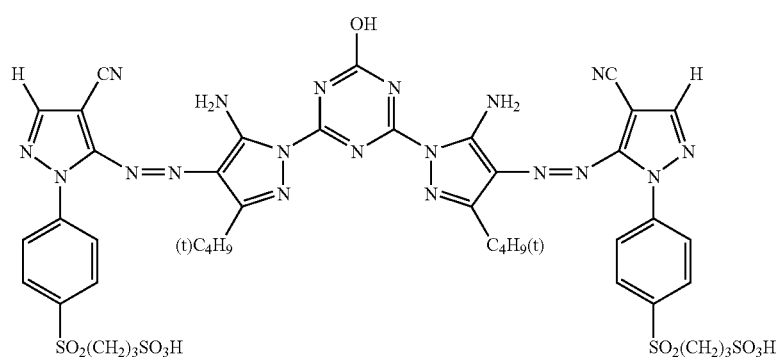
DYE-8
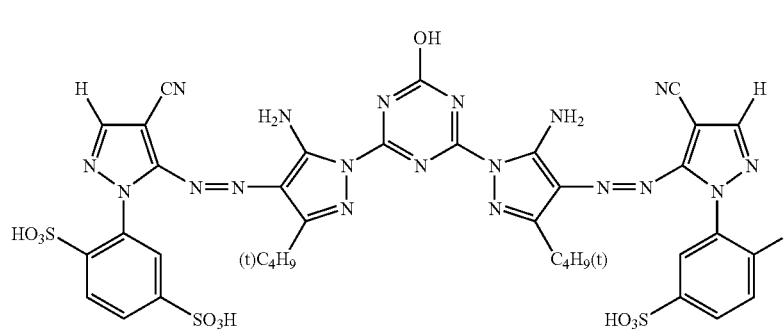
DYE-9
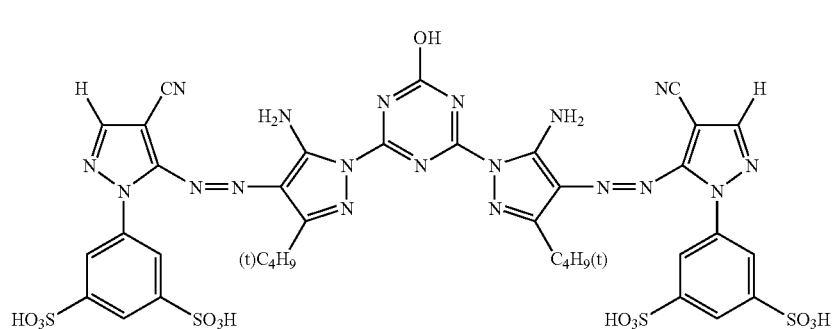

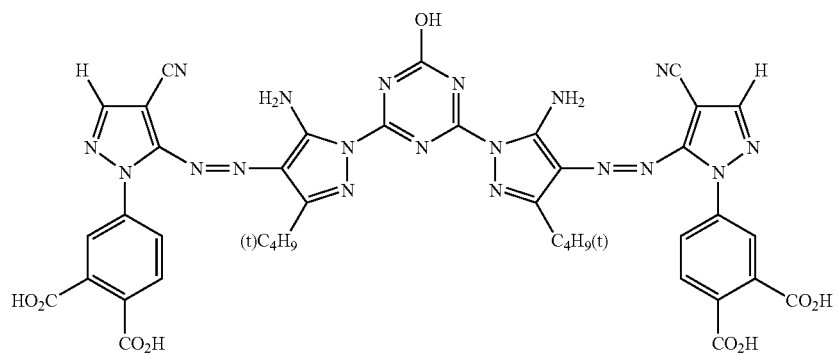
DYE-10
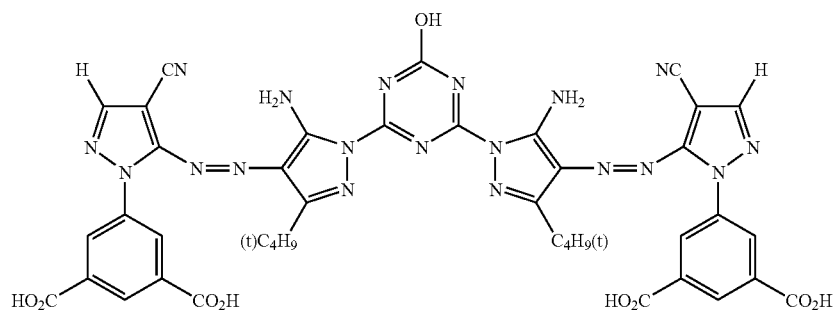
DYE-11
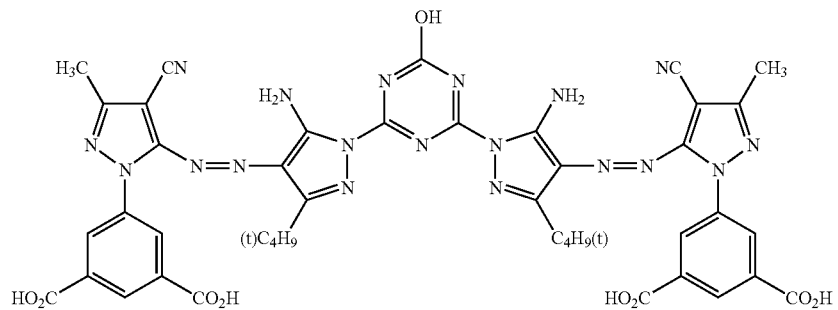
DYE-12
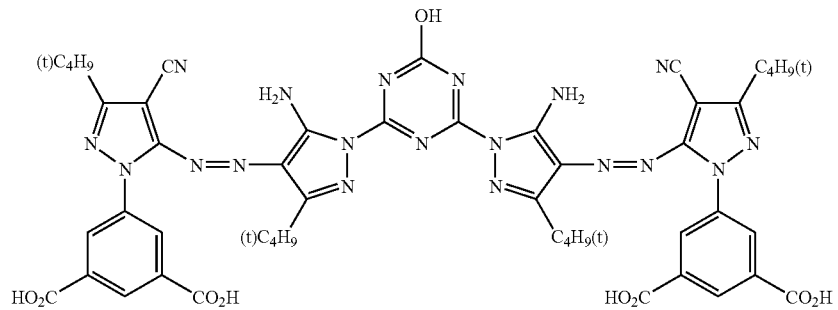
DYE-13
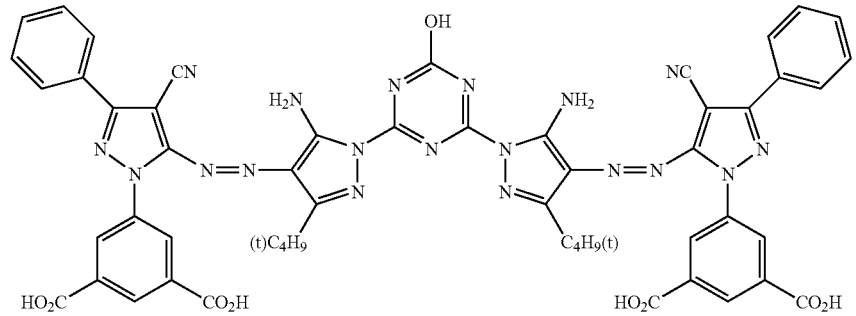
DYE-14

-continued
DYE-15
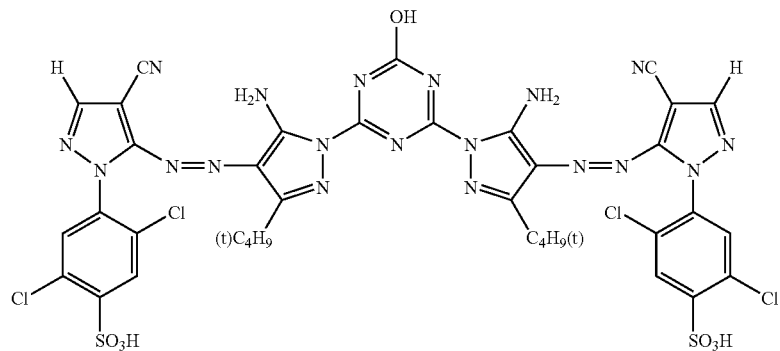
DYE-16
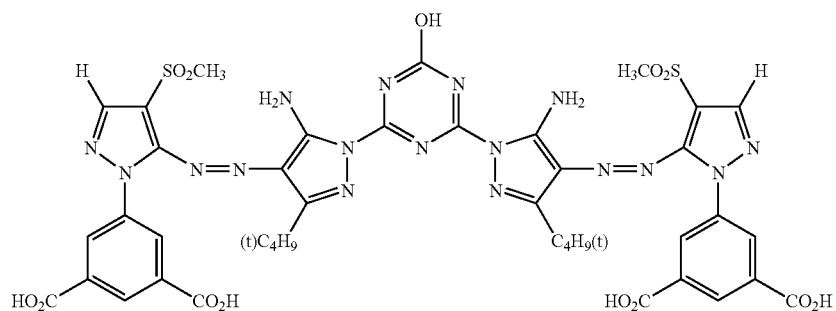
DYE-17
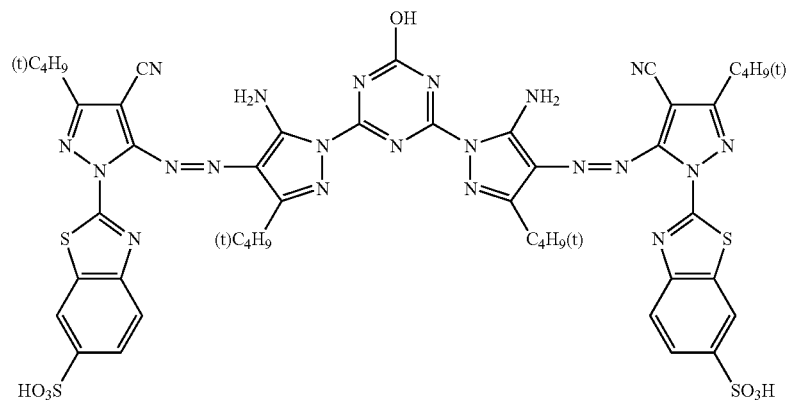
DYE-18
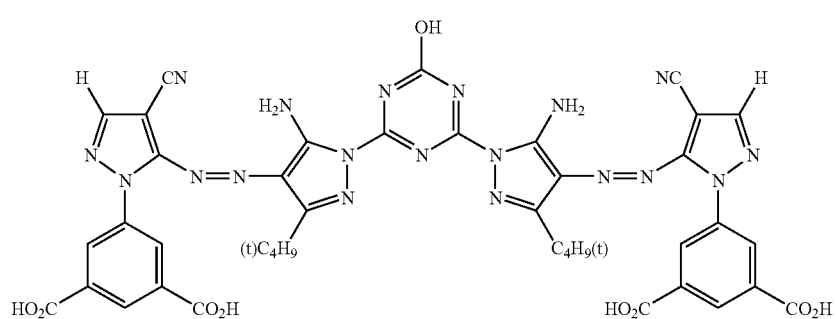

-continued
DYE-19
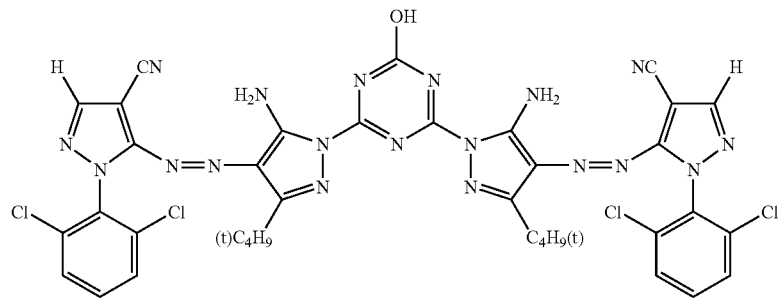
DYE-20
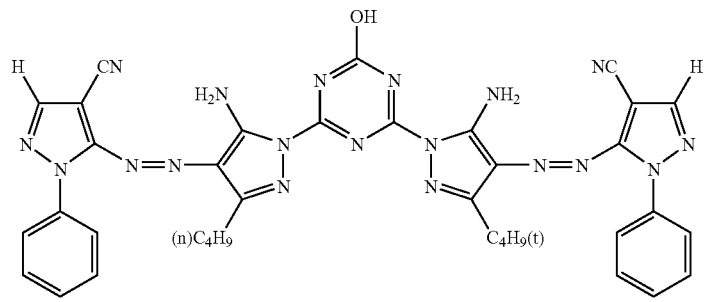
DYE-21
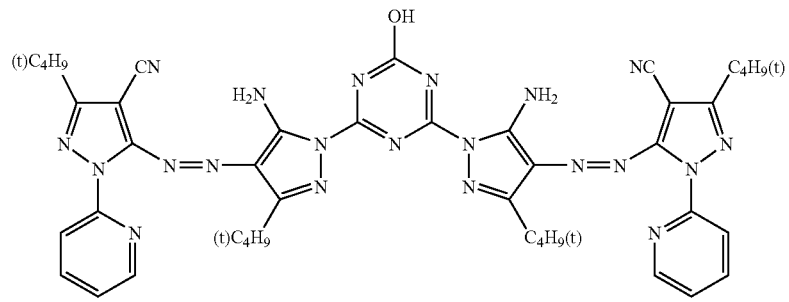
DYE-22
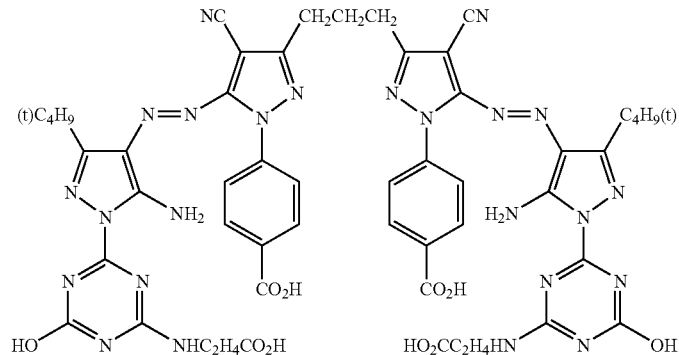
DYE-23
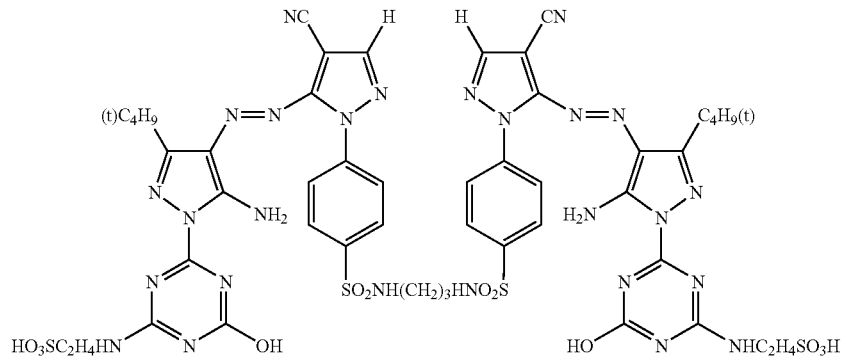

-continued
DYE-24
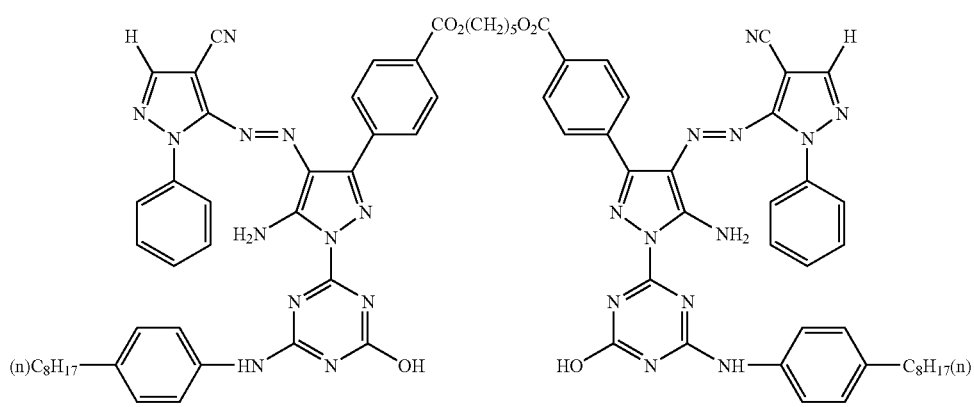
DYE-25
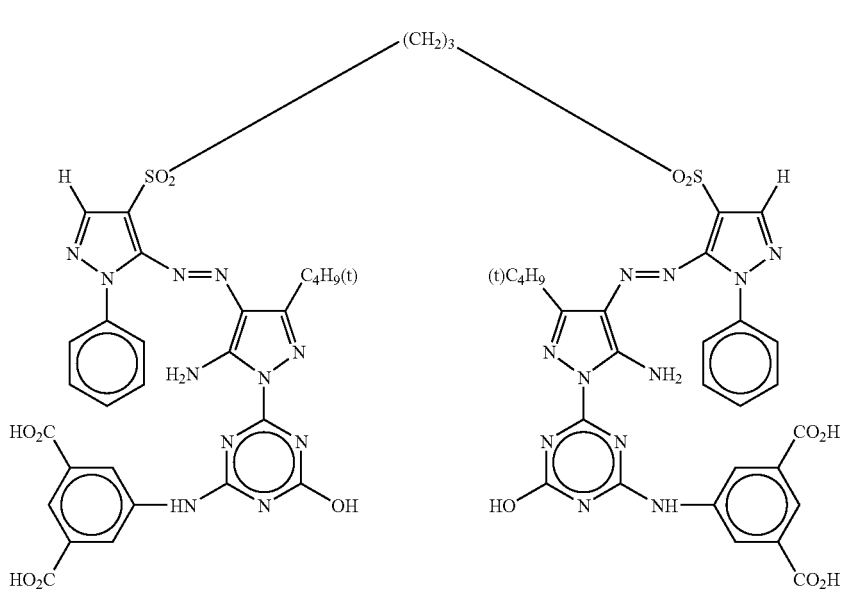
DYE-26
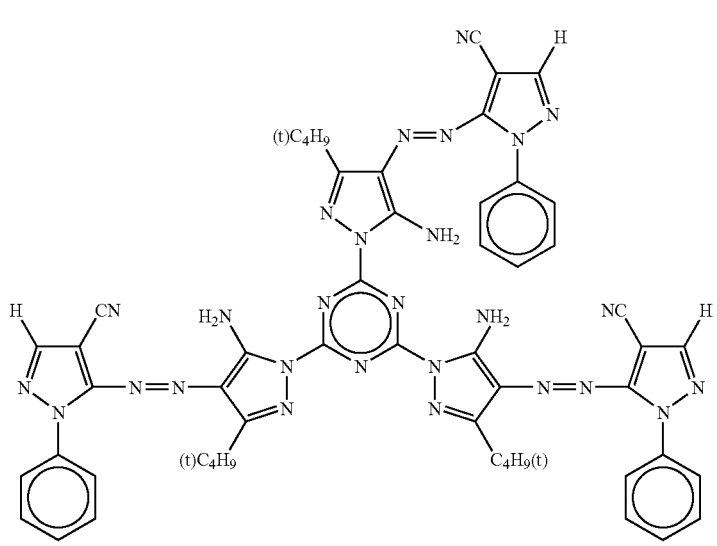

The compound represented by Formula (Y) and a salt thereof may be synthesized with reference to the synthetic methods described in, for example, JP-A Nos. 2001-279145, 2003-277661, 2003-2777662 and 2004-83903.

[Water-Soluble Magenta Dye]

In the ink composition of the invention, the specific water-soluble dye is also preferably a compound (water-soluble magenta dye) represented by the following Formula (M-1).

A magenta ink composition may be prepared by adding the compound represented by Formula (M-1) according to the ink composition of the invention. Such a magenta ink composition is significantly effective in reducing the erosive properties on inkjet printers.

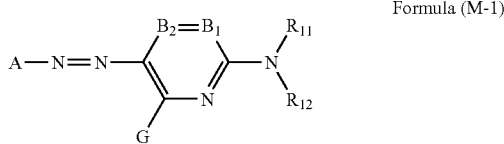

Formula (M-1)

In Formula (M-1), A represents a residue of a five-membered heterocyclic diazo component A—$NH_2$; $B_1$ and $B_2$ each represent —$CR_{13}$= or —$CR_{14}$=, or any one of $B_1$ and $B_2$ represents a nitrogen atom, and the other represents —$CR_{13}$= or $CR_{14}$=.

$R_{11}$ and $R_{12}$ each independently represent a hydrogen atom, an alkyl group, a cycloalkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group, wherein each group may further have a substituent.

G, $R_{13}$ and $R_{14}$ each independently represent a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted by an alkyl group, an aryl group or a heterocyclic group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group, a heterocyclic thio group, or an ionic hydrophilic group, wherein each group may be further substituted; and $R_{13}$ and $R_{11}$ or $R_{11}$ and $R_{12}$ may be linked to each other to form a five- or six-membered ring, provided that the compound represented by Formula (M-1) has at least one ionic hydrophilic group.

Preferred examples of the dye represented by Formula (M-1) include the compounds described in paragraphs [0032] to [0052] of JP-A No. 2008-101173.

[Water-Soluble Cyan Dye]

In the ink composition of the invention, the specific water-soluble dye is also preferably a compound (water-soluble cyan dye) represented by the following Formula (C-1).

A cyan ink composition may be prepared by adding the dye represented by Formula (C-1) according to the ink composition of the invention. Such a cyan ink is significantly effective in reducing the erosive properties on inkjet printers.

Furthermore, in view of image storage stability, the dye represented by Formula (C-1) is preferably contained at 50% by weight or more, more preferably 70% by weight or more, and particularly preferably 80% by weight or more of the water-soluble cyan dye.

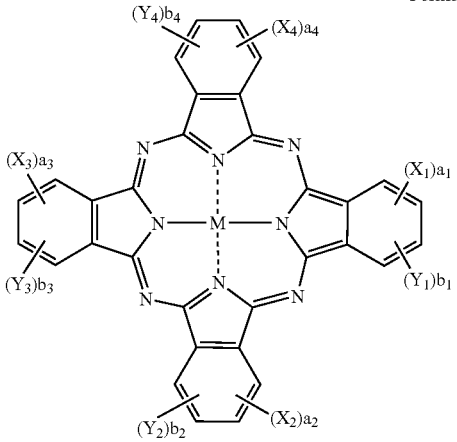

Formula (C-1)

In Formula (C-1), $X_1$, $X_2$, $X_3$, and $X_4$ each independently represent —SO—Z, —$SO_2$—Z, —$SO_2NV_1V_2$, —$CONV_1V_2$, —$CO_2Z$, —CO—Z, or a sulfo group, wherein Z each independently represents a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group; $V_1$ and $V_2$ may be the same or different and each represent a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group.

$Y_1$, $Y_2$, $Y_3$, and $Y_4$ each independently represent a hydrogen atom, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryloxy group, an amido group, an arylamino group, an ureido group, a sulfamoylamino group, an alkylthio group, an arylthio group, an alkoxycarbonylamino group, a sulfonamido group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, or an ionic hydrophilic group, wherein each group may further have a substituent.

$a_1$ to $a_4$ and $b_1$ to $b_4$ each represent the number of substituents represented by each of $X_1$ to $X_4$ and $Y_1$ to $Y_4$.

$a_1$ to $a_4$ each independently represent an integer of from 0 to 4, provided that not all of $a_1$ to $a_4$ are 0 at the same time; $b_1$ to $b_4$ each independently represent an integer of from 0 to 4.

M represents a hydrogen atom, a metal atom, an oxide thereof a hydroxide thereof or a halide thereof; provided that at least one of $X_1$, $X_2$, $X_3$, $X_4$, $Y_1$, $Y_2$, $Y_3$, or $Y_4$ represents an ionic hydrophilic group or a group having an ionic hydrophilic substituent.

Preferred examples of the dye represented by Formula (C-1) include the compounds described in paragraphs [0133] to [0140] of JP-A No. 2008-101173. The dye represented by Formula (C-1) may be synthesized according to each of the publications referred to in paragraph [0141] of JP-A No. 2008-101173.

[Water-Soluble Black Dye]

In the ink composition of the invention, the specific water-soluble dye is also preferably a compound (water-soluble black dye) represented by the following Formula (B-1).

A black ink composition may be prepared by adding the dye represented by Formula (B-1) according to the ink composition of the invention. Such a black ink is significantly effective in reducing the erosive properties on inkjet printers.

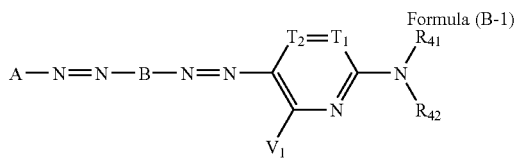

Formula (B-1)

In Formula (B-1), A and B represent an aromatic group or heterocyclic group, which may be substituted (A is a monovalent group, and B is a divalent group). $T_1$ and $T_2$ each independently represent $=CR_{43}-$ or $-CR_{44}=$. Alternatively, one of $T_1$ and $T_2$ is a nitrogen atom, and the other is $=CR_{43}-$ or $-CR_{44}=$.

$V_1$, $R_{43}$ and $R_{44}$ each independently represent a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group which may include an alkylamino group, an arylamino group, and a heterocyclic amino group, an acylamino group, a ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, a heterocyclic thio group, an alkyl or arylsulfonyl group, a heterocyclic sulfonyl group, an alkyl or arylsulfinyl group, a heterocyclic sulfinyl group, a sulfamoyl group, or a sulfo group. Further, each of the above groups may have a substituent.

$R_{41}$ and $R_{42}$ each independently represent a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkyl or arylsulfonyl group, or a sulfamoyl group, with the proviso that both $R_{41}$ and $R_{42}$ are not a hydrogen atom at the same time. Further, each of the above groups may have a substituent. $R_{43}$ and $R_{41}$, or $R_{41}$ and $R_{42}$ may bond with each other to form a 5- or 6-membered ring.

Preferred examples of the dye represented by Formula (B-1) include the compounds described in paragraphs [0152] to [0166] of JP-A No. 2008-101173.

Any other dye for adjusting the hue, the fading rate, or the like may be used in combination with the compound represented by Formula (Y) (yellow dye), the compound represented by Formula (M-1) (magenta dye), the compound represented by Formula (C-1) (cyan dye), or the compound represented by Formula (B-1) (black dye). Examples of a dye that is preferably used in combination include the compound described in paragraphs [0473] to [0481] of JP-A No. 2007-138124 (a dye for use in combination with the yellow dye), the compound described in paragraphs [0570] to [0578] of JP-A No. 2007-138124 (a dye for use in combination with the magenta dye), the compound described in paragraphs [0660] to [0664] of JP-A No. 2007-138124 (a dye for use in combination with the cyan dye), and the compound described in paragraphs [0779] to [0792] of JP-A No. 2007-138124 (a dye for use in combination with the black dye).

The ink composition of the invention preferably contains 0.5% by weight to 15% by weight of the specific water-soluble dye, based on the total weight of the composition.

The ink composition of the invention containing the specific water-soluble dye at a content in the above range is less erosive to inkjet printers and prevented from rapid-fading-induced color-balance degradation, so that it can provide images with good long-term storage stability.

When the specific water-soluble dye in the ink composition of the invention is a compound represented by Formula (Y) or a salt thereof, the content of the dye in the ink composition is preferably in a range of 0.5% by weight to 15% by weight, more preferably in a range of 1.0% by weight to 8% by weight, particularly preferably in a range of 1.5% by weight to 7% by weight.

When the content of the dye in the yellow ink composition is 0.5% by weight or more, it becomes unnecessary to eject a large amount of ink onto an image receiving paper sheet, so that blurring can be prevented under high humidity conditions and that insufficient ink drying due to an excessive amount of an organic solvent for the dye can also be prevented, which makes it possible to produce images with more stable color balance over time.

When the specific water-soluble dye is a compound represented by Formula (Y) or a salt thereof it preferably makes up 50% by weight or more of all the dyes in the yellow ink composition. When the content of the compound represented by Formula (Y) and the salt thereof in the yellow ink composition is in the above range, rapid-fading-induced color-balance degradation can be avoided, so that the ink composition is significantly effective in producing images with good long-term storage stability.

For the same reason, the content of the compound represented by Formula (Y) and the salt thereof is more preferably 70% by weight or more, particularly preferably 80% by weight or more, based on the total amount of all the dyes in the yellow ink composition.

In an embodiment of the invention, the yellow ink composition containing the compound represented by Formula (Y) may further contain other additional yellow dye in combination with the compound represented by Formula (Y) or the salt thereof. Such an additional yellow dye may be selected from any known dyes.

When the specific water-soluble dye in the ink composition of the invention is a compound represented by Formula (M-1) or a salt thereof the content of the dye in the ink composition is preferably in a range of 0.5% by weight to 15% by weight.

In an embodiment of the invention, the magenta ink composition containing the compound represented by Formula (M-1) may further contain other additional magenta dye in combination with the compound represented by Formula (M-1) or the salt thereof. Such an additional magenta dye may be selected from any known dyes.

When the specific water-soluble dye in the ink composition of the invention is a compound represented by Formula (C-1) or a salt thereof the content of the dye in the cyan ink composition is preferably in a range of 1% by weight to 10% by weight, more preferably in a range of 1.5% by weight to 8% by weight based on total amount of the cyan ink composition.

When the total content of the dye represented by Formula (C-1) in the cyan ink composition is 1% by weight or more, coloring of ink when printed on an inkjet recording medium is excellent, and an image density required is obtained. Furthermore, when the total content of the dye represented by Formula (C-1) in the cyan ink composition is 10% by weight or less, ejectability of the cyan ink in an inkjet recording method is excellent, and also an effect of preventing ink jet nozzles from clogging up is obtained.

In an embodiment of the invention, the cyan ink composition containing the compound represented by Formula (C-1) may further contain other additional cyan dye in combination with the compound represented by Formula (C-1) or the salt thereof. Such an additional cyan dye may be selected from any known dyes.

When the specific water-soluble dye in the black ink composition of the invention is a compound represented by Formula (B-1) or a salt thereof the content of the dye in the black ink composition is preferably in a range of 0.5% by weight to 15% by weight.

In an embodiment of the invention, the black ink composition containing the compound represented by Formula (B-1) may further contain other additional black dye in combination with the compound represented by Formula (B-1) or the salt thereof. Such an additional black dye may be selected from any known dyes.

(Water-Soluble Organic Solvent)

The ink composition of the invention contains at least one water-soluble organic solvent.

Examples of the water-soluble organic solvent include, but are not limited to, an alcohol (e.g., methanol, ethanol, propanol, isopropanol, butanol, isobutanol, sec-butanol, tert-butanol, pentanol, hexanol, cyclohexanol, or benzyl alcohol), a polyhydric alcohol (e.g., ethylene glycol, diethylene glycol, triethylene glycol, polyethylene glycol, propylene glycol, dipropylene glycol, polypropylene glycol, butylene glycol, hexanediol, pentanediol, glycerin, or hexanetriol), a glycol derivative (e.g., ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, triethylene glycol monomethyl ether, ethylene glycol diacetate, ethylene glycol monomethyl ether acetate, triethylene glycol monoethyl ether, triethylene glycol monopropyl ether, triethylene glycol monobutyl ether, or ethylene glycol monophenyl ether), an amine (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, or tetramethylpropylenediamine), urea, a urea derivative, and other polar solvents (e.g., formamide, N,N-dimethylformamide, N,N-dimethylacetamide, 2-pyrrolidone, N-methyl-2-pyrrolidone, N-vinyl-2-pyrrolidone, 2-oxazolidone, 1,3-dimethyl-2-imidazolidinone, acetonitrile, and acetone). The water-soluble organic solvent may be a liquid or solid compound at 25° C. Two or more water-soluble organic solvents may be used in combination.

The content of the water-soluble organic solvent in the ink composition of the invention is preferably from 10% by weight to 80% by weight, more preferably from 20% by weight to 60% by weight. As used herein, the term "water-soluble" means that the solubility in water at 25° C. is 1 g/100 g or more.

(Surfactant)

The ink composition of the invention preferably further contains a surfactant together with the sulfoxide compound, the specific water-soluble dye and the water-soluble organic solvent. The surfactant makes it possible to adjust the static surface tension and the dynamic surface tension.

The surfactant may be a nonionic, cationic or anionic surfactant. In view of ink storage stability, ejection stability, and prompt penetration of ink into image receiving paper sheets, the ink composition of the invention preferably contains a nonionic surfactant.

Examples of the nonionic surfactant include polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkylamine, glyceryl fatty acid ester, and an oxyethylene-oxypropylene block copolymer. Particularly, in view of ejection stability or prompt penetration of ink into image receiving paper sheets, an acetylene diol surfactant is preferred, and preferred examples include an acetylene glycol surfactant (preferably, an acetylene polyoxyethylene oxide surfactant). Examples of such an acetylene glycol surfactant include SURFYNOLS (trade name) (such as SURFYNOL 465 (trade name), manufactured by Air Products & Chemicals, Inc.) and OLFINE (trade name) (such as OLFINE E1010, manufactured by Nissin Chemical Industry Co., Ltd.).

The content of the surfactant in the ink composition is preferably from 0.001% by weight to 15% by weight, more preferably from 0.005% by weight to 10% by weight, even more preferably from 0.01 to 5% by weight, and particularly preferably from 0.1% by weight to 5% by weight, based on the total weight of the ink composition.

When the content of the surfactant (particularly, a nonionic surfactant) is in the above range, good ejection stability is advantageously obtained.

(Other Additives)

The ink composition of the invention may further include an appropriate amount of an additive selected from an anti-drying agent for preventing drying-induced clogging of inkjet orifices, a penetration enhancer for better penetration of ink into paper, an ultraviolet-absorbing agent, an antioxidant, a viscosity modifier, a surface tension modifier, a dispersing agent, a dispersion stabilizer, an antifungal agent, an anti-corrosive agent, a pH adjusting agent, an anti-foaming agent, a chelating agent, and so on. Examples of these various additives and what amounts of these additives should preferably be used are described in JP-A No. 2004-331871.

In an embodiment of the invention, a pH adjusting agent is preferably used to adjusting the pH or impart dispersion stability or the like. The pH of the ink composition is preferably adjusted to 4 to 11 at 25° C. If the pH is less than 4, the dye may be reduced in solubility so that it may easily cause nozzle clogging. If the pH is more than 11, water resistance may tend to be degraded. The pH adjusting agent may be a basic pH adjusting agent such as an organic base or an inorganic alkali or an acidic pH adjusting agent such as an organic acid or an inorganic acid.

Examples of the organic base include triethanolamine, diethanolamine, N-methyldiethanolamine, and dimethylethanolamine. Examples of the inorganic alkali include an alkali metal hydroxide (e.g., sodium hydroxide, lithium hydroxide, or potassium hydroxide), a carbonate (e.g., sodium carbonate or sodium hydrogen carbonate), ammonium, and so on. Examples of the organic acid include acetic acid, propionic acid, trifluoroacetic acid, alkyl sulfonic acid, and so on. Examples of the inorganic acid include hydrochloric acid, sulfuric acid, phosphoric acid, and so on.

In an embodiment of the invention, the ink composition contains at least water. Water may be used by itself or water and the water-soluble organic solvent may be used in the form of a mixed solvent.

In an embodiment of the invention, the content of water is preferably, but not limited to, from 10% by weight to 99% by weight, more preferably from 30% by weight to 80% by weight, even more preferably from 50% by weight to 70% by weight.

(Filtration)

In the preparation of the ink composition of the invention, the process of removing solid dust by filtration is important to improve the ink stability and the hue. This process may be performed using a filter. The filter used in this process should have an effective pore size of 1 μm or less, preferably from 0.05 μm to 0.3 μm, and more preferably from 0.20 μm to 0.3 μm. The filter may be made of various materials. Particularly in the case of water-soluble dye ink, a filter prepared for aqueous solvents is preferably used. In particular, a jacketed filter, which is produced with a polymer material and particularly less likely to release dust, is preferably used. In the filtration process, the ink composition may be allowed to flow through the jacket, and any of a pressure filtration method and a filtration method under reduced pressure may be used.

After the filtration, air is often entrained into the solution. Such air causes foaming, which often disturbs images in inkjet recording. In an embodiment of the invention, therefore, a deforming process should be separately performed. Various deforming methods such as ultrasonic deforming and deforming under reduced pressure may be used.

(Physical Properties of Inkjet Ink Composition)

In an embodiment of the invention, the ink composition preferably has a viscosity of 3 mPa·s to 10 mPa·s at 23° C. If it is more than 10 mPa·s, the recorded image-fixing speed may be low, and ejection performance may also tend to be low. If it is less than 3 mPa·s, recorded images may blur to be reduced in quality.

The viscosity may be arbitrarily adjusted by adjusting the amount of the addition of the water-soluble organic solvent. The viscosity may also be adjusted by adding a viscosity modifier (a thickener) such as a variety of high-molecular-weight polymers.

Although a method of measuring the viscosity is described in detail in JIS Z 8803, the viscosity may be conveniently measured using a commercially available viscometer. For example, the viscometer may be a rotary viscometer such as a B-type or E-type viscometer manufactured by TOKYO KEIKI INC. In an embodiment of the invention, the viscosity is measured at 25° C. with an E-type viscometer (trade name: TV-22, manufactured by TOM SANGYO CO., LTD.). Concerning the unit of viscosity, pascal second (Pa·s), millipascal second (mPa·s) is generally used.

The ink composition of the invention preferably has a static surface tension of 25 mN/m to 40 mN/m at 23° C., more preferably a static surface tension of 30 mN/m to 40 mN/m at 23° C. If the static surface tension of the ink composition exceeds 40 mN/m, a significant reduction in printing quality may occur, such as reduction in ejection stability, occurrence of blurring during color mixing, or occurrence of strings (for example, when black characters are printed on a cyan solid print, string-hike blurring may occur from the black characters). If the static surface tension of the ink composition is less than 25 mN/m, the ink composition may be deposited on the hardware surface during ejecting, so that defective printing may occur.

With respect to measurement of static surface tension, a capillary rise method, a falling-drop method and a hanging ring method are known to be applicable. However, a vertical plate method is adopted as the static surface tension measurement in the invention. The principle of the vertical plate method is explained below. When hanging a thin plate of glass or platinum in a vertical direction so as to immerse a part of the thin plate into a liquid, the surface tension of the liquid acts downward along the length of the contact portion between the liquid face and the thin plate. The surface tension can be determined by balancing this downward force with an upward force hanging the thin plate.

The dynamic surface tension of the ink composition used in the invention at 23° C. is preferably from 25 mN/m to 40 mN/m, and more preferably from 30 mN/m to 40 mN/m. In a case where the dynamic surface tension is more than 40 mN/m, ejection stability degrades, and further, image quality is also significantly degrades owing to generation of blurring in color mixing, or occurrence of strings. Also, in a case where the surface tension is less than 25 mN/m, adhesion of the ink to a surface of the hardware at time of ink ejection occurs to result in defects of printing.

With respect to measurement of dynamic surface tension, on the other hand, a vibrating jet method, a meniscus dropping method and a maximum bubble pressure method are known to be applicable, as described in Shin Jikken Kagaku Koza, vol. 18 (Kaimen to Colloid), pages 69 to 90, Maruzen Co., Ltd. (1977). In addition, the liquid membrane break method as described in JP-A No. 3-2064 is also known to be applicable. However, the measurement of dynamic surface tension in the invention is carried out using a bubble pressure differential method. The principle of this method and the way to measure are explained below.

Air bubbles are generated in a surfactant-added solution rendered homogeneous by stirring, and thereby a new air-liquid interface is formed and the surfactant molecules in the solution are gathered on the water surface at a constant rate. When the bubble rate (the bubble generation rate) is made slower in making changes thereto, a greater number of surfactant molecules can be gathered on the bubble surface, and the maximum bubble pressure right before bubbles burst can be lowered. As a result, the maximum bubble pressure (surface tension) relative to the bubble rate can be detected. For determination of dynamic surface tension in the invention, it is possible to suitably use a method of generating air bubbles in a solution by use of two probes large and small, measuring a pressure difference between the two probes under the maximum bubble pressure conditions, and therefrom calculating the dynamic surface tension.

The static surface tension and the dynamic surface tension may be adjusted to be in the above range using a surface tension modifier.

The surface tension modifier may be a nonionic, cationic or anionic surfactant. Examples of the anionic surfactant include a fatty acid salt, an alkyl sulfate ester salt, an alkyl aryl sulfonate (e.g., an alkyl benzene sulfonate or a petroleum sulfonate), a dialkyl sulfosuccinate, an alkyl phosphonate ester salt, a formaldehyde condensate of naphthalene sulfonic acid, and a polyoxyethylene alkyl sulfate ester salt. Examples of the nonionic surfactant include an acetylene diol (e.g., 2,4,7,9-tetramethyl-5-decyne-4,7-diol), polyoxyethylene alkyl ether (e.g., polyoxyethylene decyl ether or an ethylene oxide adduct of an acetylene diol), polyoxyethylene fatty acid ester, sorbitan fatty acid ester, polyoxyethylene sorbitan fatty acid ester, polyoxyethylene alkylamine, glyceryl fatty acid ester, and an oxyethylene-oxypropylene block copolymer.

An amine oxide amphoteric surfactant such as N,N-dimethyl-N-alkylamine oxide is also preferred. In addition, surfactants described in JP-A No. 59-157636, pages 37 to 38 and Research Disclosure No. 308119 (1989) may also be used.

An anionic surfactant having a hydrophobic moiety including two chains or a branched hydrophobic moiety, an anionic or nonionic surfactant having a hydrophilic group located near the center of the hydrophobic moiety, or a nonionic surfactant having a hydrophobic moiety including two chains or a branched hydrophobic moiety is preferred, because it is less likely to precipitate or separate from each of the above ink compositions and less likely to foam.

For this purpose, the content of the surfactant in the ink composition should be from 0.001% by weight to 15% by weight, preferably from 0.005% by weight to 10% by weight, and more preferably from 0.01% by weight to 5% by weight.

In regard to the method for preparing an inkjet ink composition, various processes are described in detail in JP-A Nos. 5-148436, 5-295312, 7-97541, 7-82515 and 7-118584, and these methods may also be used for the preparation of the inkjet ink composition in the invention.

(Inkjet Recording Method)

The inkjet recording method of the invention is characterized by including: using an inkjet printer having a silicon oxide layer ($SiO_2$ layer) or a silane coupling layer in at least part of a member thereof with which ink is brought into contact; and ejecting an inkjet ink composition from the inkjet printer to record an image on an inkjet recording medium, wherein the inkjet ink composition contains a sulfoxide compound, a water-soluble dye having an aromatic heterocycle in a molecule thereof water, and a water-soluble organic solvent, in which the content of the sulfoxide compound is 1% by weight or more but less than 10% by weight based on the total weight of the inkjet ink composition.

According to the feature of the invention, the inkjet recording method is less erosive to the inkjet printer having a silicon oxide layer or a silane coupling layer.

For example, therefore, the use of ink is prevented from reducing the thickness of the silicon oxide layer in the inkjet printer head or from reducing the contact angle of the ink on the silane coupling layer of the nozzle plate surface of the inkjet printer head, so that the inkjet ink composition can be uniformly ejected to form a sharp image and that the durability of the inkjet printer head can also be improved.

The inkjet recording method of the invention includes using at least an inkjet printer having a silicon oxide layer (e.g., a $SiO_2$ layer) or a silane coupling layer in at least part of a member thereof with which ink is brought into contact. The inkjet printer has at least one of these layers.

As used herein, the term "a member thereof with which ink is brought into contact" refers to a member of the inkjet printer, with which the inkjet ink composition used in the inkjet recording is brought into contact, such as an inkjet printer head (which may be simply called a head), a nozzle (including the surface of a nozzle plate), an ink tank, a pressure chamber, or an ink flow channel.

When the inkjet printer used has a silicon oxide layer or a silane coupling layer in at least part of a head or a nozzle as the member with which ink is brought into contact, particularly when the inkjet printer used has an ink flow channel whose ink-contacting surface is made of a silicon oxide layer and/or has a nozzle plate whose surface is made of a silane coupling layer, the inkjet recording method of the invention is advantageous in that it is significantly effective in preventing erosion of the head or the nozzle and in improving uniform ink-ejection.

The phrase "having a silicon oxide layer or a silane coupling layer in at least part of a member thereof with which ink is brought into contact" is intended to include a case where the whole or part of the member thereof has the silicon oxide layer or the silane coupling layer and also include a case where part of the member thereof is made of silicon oxide in the form that is difficult to be identified as a layer according to the invention, or a case where part of the member has a portion where silane coupling treatment has undergone.

The silicon oxide layer may be formed by any method.

Conventionally, when at least part of the member, with which ink is brought into contact, is made of a silicon oxide layer, ink may cause a more significant reduction in the thickness of the layer. In contrast, this is prevented by the inkjet recording method of the invention.

The silane coupling layer may be formed by any method. Particularly, in order to produce a significant effect in preventing ink from causing erosion or in uniformly ejecting ink, the silane coupling layer is preferably formed using a silane coupling agent containing a fluorine atom in the molecule, more preferably, the silane coupling layer is formed by a fluorine atom-containing silane coupling agent to form an ink-repellent nozzle plate surface.

Examples of the silane coupling agent include KA-1003, KBM-1003, KBE-1003, KBM-303, KBM-403, KBE-402, KBE-403, KBM-1403, KBM-502, KBM-503, KBE-502, KBE-503, KBM-5103, KBM-602, KBM-603, KBE-603, KBM-903, KBE-903, KBE-9103, KBM-573, KBM-575, KBM-6123, KBE-585, KBM-703, KBM-802, KBM-803, KBE-846, KBE-9007, KBM-04, KBE-04, KBM-13, KBE-13, KBE-22, KBE-103, HMDS-3, KBM-3063, KBM-3103C, KPN-3504, and KF-99 (each trade name, manufactured by Shin-Etsu Chemical Co., Ltd.). Examples of the silane coupling agent containing a fluorine atom in the molecule include KP-801M and X-24-7890 (each trade name, manufactured by Shin-Etsu Chemical Co., Ltd.) and NANOS series such as NANOS-B, NANOS-Y and NANOS-SG (each trade name, manufactured by T & K Inc.). In particular, KP-801M, X-24-7890, NANOS-B, or NANOS-SG is preferably used, so that good ink-repellency or scratch resistance can be obtained.

For example, the silane coupling layer may form the surface of an inkjet head nozzle plate or the like in an inkjet printer.

The inkjet recording method of the invention also includes using an inkjet ink composition containing 1% by weight or more but less than 10% by weight of at least one sulfoxide compound, based on the total weight of the inkjet ink composition.

Examples and preferred examples of the sulfoxide compound, the content of the sulfoxide compound, and so on are substantially the same as those described above in the section on the inkjet ink composition.

The inkjet recording method of the invention, which includes using an inkjet ink composition containing 1% by weight or more but less than 10% by weight of the sulfoxide compound based on the total weight of the inkjet ink composition, is less corrosive to inkjet printers, allows good ink ejectability, and produces sharp images.

If the content of the sulfoxide compound is 10% by weight or more, it may be difficult to prevent erosion or degradation of an ink flow channel or a head member of an inkjet printer, so that ink ejectability may be degraded, which may make it impossible to obtain sharp images.

The inkjet recording method of the invention includes using an inkjet ink composition containing at least one water-soluble dye.

In particular, the water-soluble dye having an aromatic heterocycle in the molecule, which is described above for use in the inkjet ink composition of the invention, is preferably used, while any type of water-soluble dye may be used. Preferred examples and the content of the water-soluble dye are the same as those described above.

In the inkjet recording method of the invention, the inkjet ink composition of the invention described above is preferably used in view of erosive properties on inkjet printers and ink ejectability as described above, and preferred aspects of the ink composition are also the same as those described above.

(Inkjet Recording Medium)

In the inkjet recording method of the invention, an image is recorded with the inkjet recording ink and an inkjet printer. The inkjet recording medium such as a recording paper, a recording film and the like includes materials known to be applied for recording, such as a recording paper, a resin coat paper, an inkjet exclusive paper as described in, for example, JP-A-Nos. 8-169172, 8-27693, 2-276670, 7-276789, 9-323475, 62-238783, 10-153989, 10-217473, 10-235995, 10-337947, 10-217597, and 10-337947, a film, a paper for common use in an inkjet recording and an electro-photographic transferring, a textile, a glass, a metal, ceramics or the like.

(Support)

An example of the support for the inkjet recording medium such as a recording paper, a recording film and the like is a paper manufactured from chemical pulp such as LBKP or NBKP, mechanical pulp such as GP, PGW, RMP, TMP, CTMP, CMP or CGP, or waste paper pulp such as DIP, wherein known additives including a dye, a binder, a sizing agent, a fixing agent, a cationic agent and a paper strength increasing agent are mixed as needed, by use of a paper machine such as a Fourdrinier machine or a vat machine. Other examples of the support are synthetic paper and plastic film sheets. The suitable thickness of the support is from 10 μm to 250 μm, and the suitable basis weight of the support is from 10 g/m$^2$ to 250 g/m$^2$.

As the support, a paper laminated with polyolefin (e.g., polyethylene, styrene, polybutene, and copolymers thereof) or polyethylene terephthalate on both sides, or plastic film is more preferably used. To the polyolefin, a white pigment (e.g., titanium dioxide, zinc oxide) or a tinting dye (e.g., cobalt blue, ultramarine blue, neodymium oxide) is preferably added.

(Inorganic Fine Particles)

In the invention, among the inkjet recording medium described above, it is preferable that an inkjet recording medium has an ink-receiving layer containing inorganic fine particles on the support. The ink-receiving layer provided on the support is explained below.

In the image-receiving layer, a porous material and an aqueous binder may be incorporated as a component. Further, as the inorganic fine particles, a pigment is preferably contained in the image-receiving layer. A white pigment is suitable as the pigment. Examples of a white pigment include inorganic white pigments, such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate; and organic pigments, such as styrene pigment, acrylic pigment, urethane resin and melamine resin. Of these pigments, porous white inorganic pigments are preferred over the others. Particularly, synthetic amorphous silica having a great pore area is preferably used. As the synthetic amorphous silica, silicic acid anhydride synthesized in dry process (vapor-phase process), or hydrated silicic acid synthesized in a wet process is usable.

Examples of the inkjet recording medium containing the foregoing pigments in its image-receiving layer include those disclosed in JP-A-Nos. 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777 and 2001-301314.

(Binder)

Examples of an aqueous binder contained in the image-receiving layer include water-soluble polymers, such as polyvinyl alcohol or polyvinyl alcohol derivatives, for example, polyvinyl alcohol and silanol-modified polyvinyl alcohol; starch, cationic starch, casein, gelatin, carboxymethyl cellulose, hydroxyethyl cellulsode, polyvinyl pyrrolidone, polyalkylene oxides and polyalkylene oxide derivatives; and water-dispersible polymers, such as styrene-butadiene latex and an acrylic emulsion. These aqueous binders can be used alone or as combinations of two or more thereof. Of those aqueous binders, polyvinyl alcohol or polyvinyl alcohol derivatives such as polyvinyl alcohol and silanol-modified polyvinyl alcohol are especially favorable from the viewpoints of adhesion to pigments and delamination resistance of the ink-receiving layer.

In addition to pigments and aqueous binders, the image-receiving layer may further contain other additives, such as a mordant, a waterproofing agent, a light resistance improver, a gas resistance improver, a surfactant and a hardener. To the image-receiving layer, an immobilized mordant is preferably added. Therefore, it is appropriate to use a polymeric mordant from a viewpoint of bleeding prevention.

The method of jetting ink that is used in the inkjet recording ink set of the invention is not particularly restricted, but any known methods may be used. More specifically, methods usable in the invention include a charge control method in which ink is jetted by utilizing an induced electrostatic force, a drop-on-demand method (a pressure pulse method) utilizing piezo element vibration pressure, an acoustic inkjet method in which radiation pressure created by irradiating ink with acoustic beams converted from electric signals is utilized for jetting ink, and a thermal inkjet (Bubble Jet, Registered Trademark) method in which bubbles are formed by heating ink and the pressure created thereby is utilized for jetting ink. The inkjet recording methods included a method of jetting a great number of minute-volume droplets of ink low in density referred to as the photo ink, a method of improving image quality by the use of two or more kinds of ink substantially the same in hue but different in density, and a method of using colorless invisible ink.

All publications, patent applications, and technical standards mentioned in this specification are herein incorporated by reference to the same extent as if each individual publication, patent application, or technical standard was specifically and individually indicated to be incorporated by reference.

EXAMPLES

The invention will be described below in more detail with reference to examples thereof. The invention is not limited to below-described examples, provided that no departure is made from the essence thereof. Further, the term "part" is based on a weight standard, unless stated otherwise.

Example 1

Preparation of Black Ink

Preparation of Black Ink K-101

To the following compounds, ion-exchanged water was added in an amount to make the total weight be 1000 g, and stirred for 1 hour while heating at a temperature of 30° C. to 40° C. The resulting solution was subjected to pressure filtration using a microfilter having an average pore diameter of 0.2 µm, thereby preparing a black ink K-101.

| <Formula of Black Ink K-101> | |
|---|---|
| -Solid Components- | |
| Black dye (potassium salt of Black Dye K-1 set forth below) | 60.0 g |
| PROXEL XL-2 (trade name, manufactured by Arch Chemicals Japan, Inc.) | 1.0 g |
| -Liquid Components- | |
| Glycerin | 81 g |
| Triethylene glycol | 96 g |
| Triethylene glycol monobutyl ether | 91 g |
| Propylene glycol | 3 g |
| OLFINE E1010 | 20 g |
| (trade name, ethylene oxide (10 mol) adduct of acetylene diol (nonionic surfactant) manufactured by Nissin Chemical Industry Co, Ltd.) | |
| Methionine sulfoxide | 50 g |
| Ion-exchanged water | 598 g |
| (an amount to make the total weight of solid components and liquid components be 1000 g) | |

Black Dye K-1

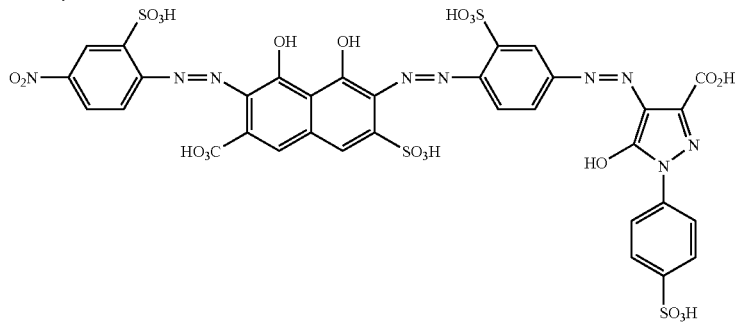

Example 2

Preparation of Yellow Ink Y-101

An ink shown in Table 1 was prepared in a manner substantially similar to that in Example 1, except that the potassium salt of Black Dye K-1 used in Example 1 was changed to potassium salt of Yellow Dye Y-1 set forth below.

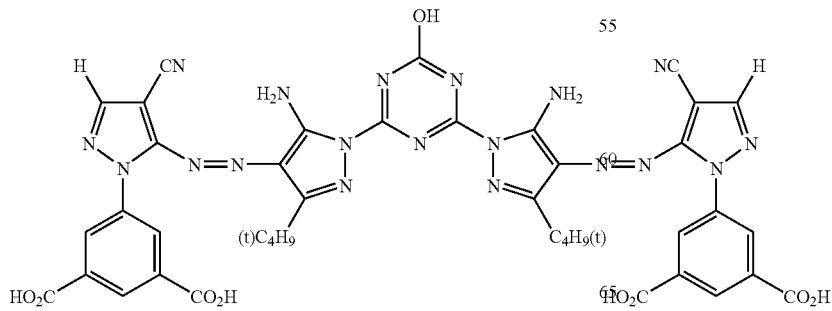

Ywellow Dye Y-1

Examples 3 and 4

Preparation of Yellow Inks Y-102, and Y-103

Inks shown in Table 1 were each prepared in a manner substantially similar to that in Example 2, except that the content of methionine sulfoxide used in Example 2 was changed to that as indicated in Table 1.

Example 5

Preparation of Yellow Ink Y-104

An ink shown in Table 1 was prepared in a manner substantially similar to that in Example 2, except that methionine sulfoxide used in Example 2 was changed to a sulfoxide compound indicated in Table 1.

Comparative 1

Preparation of Black Ink KC-101

An ink were prepared in a manner substantially similar to that in Example 1, except that methionine sulfoxide used in Example 1 was changed to ion-exchanged water.

Comparative 2

Preparation of Yellow Ink YC-101

An ink was prepared in a manner substantially similar to that in Example 2, except that the content of methionine sulfoxide used in Example 2 was changed to that indicated in Table 1.

Comparative 3

Preparation of Yellow Ink YC-102

An ink were prepared in a manner substantially similar to that in Example 2, except that methionine sulfoxide used in Example 2 was changed to ion-exchanged water.

(Evaluation)

<Evaluation of Erosion of Head Member>

(A) Erosion of Surface Protective Silicon Oxide Layer (Silicon Oxide Layer)

A silicon substrate with a size of 2 cm×2 cm having a silicon oxide layer (thickness of 100 nm) formed on the surface by thermal oxidation was immersed in 50 mL of the ink composition obtained in each of the examples and the comparative examples, and allowed to stand at 60° C. for 100 hours under sealed conditions. The silicon substrate was then taken out from the ink composition, and the thickness of the silicon oxide layer was measured using an automatic ellipsometer (manufactured by HiSOL, Inc.). Reduction in the thickness of the silicon oxide layer was determined by calculating the difference between the thicknesses of the silicon oxide layer before and after the immersion.

The smaller the reduction in the thickness of the silicon oxide layer, the better the silicon layer is. In a case where the silicon oxide layer has larger reduction in the thickness by ink erosion, a relatively thick silicon oxide layer should be formed in advance. In this case, however, a strain and so on by the silicon oxide layer may be applied to cause deformation and so on, that is not preferable.

(B) Evaluation of Erosion of Silane Coupling Layer (Ink-Repellant Layer) by Contact Angle (b1) Preparation of Silane Coupling Layer (Ink-Repellant Layer)

A thermally oxidized silicon layer was formed on the surface of a silicon substrate in a manner substantially similar to that in the above test. After the surface of the silicon substrate was activated by oxygen gas etching in an Ar atmosphere, a 20 nm-thick silane coupling layer was formed on the surface using a fluorine atom-containing silane coupling agent (product name: NANOS-B, manufactured by T & K Inc.), so that the surface was made ink-repellent.

(b2) Evaluation of Contact Angle on Silane Coupling Layer

The contact angle of the ink composition (obtained in each of the examples and the comparative examples) on the ink-repellent surface of the silicon substrate prepared as described above was determined using a contact angle meter (trade name: DROPMASTER DM700, manufactured by Kyowa Interface Science Co., Ltd.) before the substrate was immersed in the ink composition.

Separately from this process, the ink-repellent silicon substrate obtained as described above was cut into 2 cm×4 cm pieces, and the cut piece was then immersed in 50 mL of the ink composition obtained in each of the examples and the comparative examples, and allowed to stand at 45° C. for 100 hours under sealed conditions. The silicon substrate was then taken out from the ink composition, and measured for the contact angle of the ink composition in a manner substantially similar to that in the contact angle measurement before the immersion. The degree of a change in the contact angle was evaluated.

<Evaluation of Drainage of Ink from Silane Coupling Layer (Ink-Repellent Layer)>

The ink-repellent silicon substrate prepared as described above was cut into 2 cm×3 cm pieces. The cut piece was then immersed in 50 mL of the ink composition. The substrate was then pulled up from the ink composition at a speed of 10 cm/second, and the time until the ink deposited over the surface of the substrate dropped out of the substrate (ink drainage time) was evaluated according to the criteria shown below. Level 3 is most preferable.

—Evaluation Criteria—

Level 3: the ink drainage time is less than 3 seconds.

Level 2: the ink drainage time is 3 seconds or more but less than 5 seconds.

Level 1: the ink drainage time is 5 seconds or more.

<Ink-Ejectability Test>

The head member of an inkjet printer (trade name: DMP-2831, manufactured by FUJIFILM Dimatix Inc.) in which the surface of the nozzle plate was made ink-repellent was immersed in 100 mL of the ink composition obtained in each of the examples of the comparative examples, and allowed to stand at 45° C. for 100 hours under sealed conditions. The head member was then taken out from the ink composition, washed with ion-exchanged water and dried. Thereafter, the head component was installed in the printer, and the ink composition was charged into the head. Sheets of inkjet image receiving paper (trade name: GASSAI Value, manufactured by FUJIFILM Corporation) were charged into the printer, and a test pattern was printed on the sheets for evaluation. Level 3 is most preferable.

—Evaluation Criteria—

Level 3: the pattern is clearly printed.

Level 2: the pattern on the printout is partially blurry.

Level 1: the ink-ejecting direction deviates, so that the pattern is not clearly printed.

TABLE 1

| Ink Composition | Sulfoxide Compound | | Reduction in Thickness of Silicon Oxide Layer (nm) | Contact Angle of Silane Coupling Layer (Ink - Repellent Layer) | | Erosion | |
|---|---|---|---|---|---|---|---|
| | Compound | Content (% by weight) | | Before Immersion | After Immersion | Drainage Time | Ink Ejectability |
| K-101 | Methionine Sulfoxide | 5 | 4 | 81° | 78° | Level 3 | Level 3 |
| Y-101 | Methionine Sulfoxide | 5 | 2 | 82° | 79° | Level 3 | Level 3 |
| Y-102 | Methionine Sulfoxide | 9 | 1 | 80° | 78° | Level 3 | Level 3 |
| Y-103 | Methionine Sulfoxide | 2 | 4 | 82° | 76° | Level 3 | Level 3 |
| Y-104 | Bis(2-hydroxyethyl)sulfoxide | 5 | 4 | 81° | 73° | Level 3 | Level 3 |
| KC-101 | — | — | 25 | 80° | 42° | Level 1 | Level 1 |
| YC-101 | Methionine Sulfoxide | 12 | 2 | 78° | 76° | Level 3 | Level 2 |
| YC-102 | — | — | 28 | 80° | 39° | Level 1 | Level 1 |

The results in Table 1 show that when an ink composition containing a specific amount of a sulfoxide compound according to the invention is used in an inkjet printer having, an inkjet head, wherein in an ink contacting member thereof an ink-repellent layer made of silicon oxide or produced with a silane coupling agent is used, ink erosion of the head member was reduced, so that good ejectability can be achieved even during long-term use. A comparison between Examples 1 and 2 shows that a more advantageous effect is obtained when a specific dye of the invention is used in combination.

What is claimed is:

1. An inkjet ink composition, comprising: a sulfoxide compound; a water-soluble dye having an aromatic heterocycle in a molecule thereof; water; and a water-soluble organic solvent, wherein a content of the sulfoxide compound is 1% by weight or more but less than 10% by weight, based on the total weight of the inkjet ink composition, and wherein the sulfoxide compound is a sulfoxide derivative of an amino acid.

2. The inkjet ink composition according to claim 1, wherein the water-soluble dye is a dye represented by the following Formula (Y):

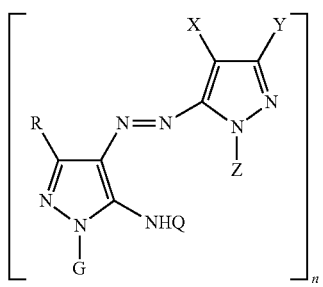

Formula (Y)

wherein G represents a heterocyclic group; R, X, Y, Z, and Q each represent a hydrogen atom or a substituent; and n represents an integer of from 1 to 3, provided that when n is 1, R, X, Y, Z, Q, and G each represent a hydrogen atom or a monovalent substituent, when n is 2, R, X, Y, Z, Q, and G each represent a hydrogen atom, a monovalent substituent or a divalent substituent, but one of them represents a divalent substituent, and when n is 3, R, X, Y, Z, Q, and G each represent a hydrogen atom, a monovalent substituent, a divalent substituent or a trivalent substituent, but two of them each represent a divalent substituent, or one of them represents a trivalent substituent.

3. The inkjet ink composition according to claim 1, wherein the sulfoxide compound is methionine sulfoxide.

4. The inkjet ink composition according to claim 1, wherein the sulfoxide compound is a sulfoxide derivative of an amino acid, and the water-soluble dye is a dye represented by the following Formula (Y):

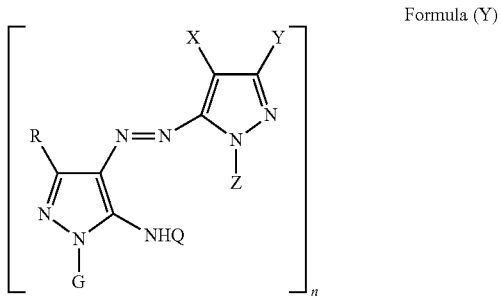

Formula (Y)

wherein G represents a heterocyclic group; R, X, Y, Z, and Q each represent a hydrogen atom or a substituent; and n represents an integer of from 1 to 3, provided that when n is 1, R, X, Y, Z, Q, and G each represent a hydrogen atom or a monovalent substituent, when n is 2, R, X, Y, Z, Q, and G each represent a hydrogen atom, a monovalent substituent or a divalent substituent, but one of them represents a divalent substituent, and when n is 3, R, X, Y, Z, Q, and G each represent a hydrogen atom, a monovalent substituent, a divalent substituent or a trivalent substituent, but two of them each represent a divalent substituent, or one of them represents a trivalent substituent.

5. The inkjet ink composition according to claim 4, wherein the sulfoxide compound is methionine sulfoxide.

6. An inkjet recording method comprising:
utilizing an inkjet printer having a silicon oxide layer or a silane coupling layer in at least part of a member thereof with which ink is brought into contact; and
ejecting an inkjet ink composition from the inkjet printer to record an image on an inkjet recording medium, wherein the inkjet ink composition contains a sulfoxide compound and a water-soluble dye, wherein a content of the sulfoxide compound is 1% by weight or more but less than 10% by weight, based on the total weight of the inkjet ink composition, and wherein the sulfoxide compound is a sulfoxide derivative of an amino acid.

7. The inkjet recording method according to claim 6, wherein the water-soluble dye is a dye represented by the following Formula (Y):

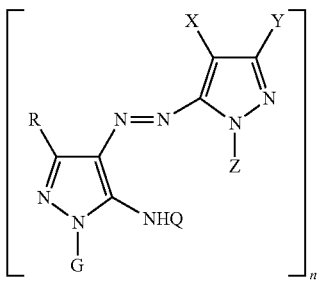

Formula (Y)

wherein G represents a heterocyclic group; R, X, Y, Z, and Q each represent a hydrogen atom or a substituent; and n represents an integer of from 1 to 3, provided that when n is 1, R, X, Y, Z, Q, and G each represent a hydrogen atom or a monovalent substituent, when n is 2, R, X, Y, Z, Q, and G each represent a hydrogen atom, a monovalent substituent or a divalent substituent, but one of them represents a divalent substituent, and when n is 3, R, X, Y, Z, Q, and G each represent a hydrogen atom, a monovalent substituent, a divalent substituent or a trivalent substituent, but two of them each represent a divalent substituent, or one of them represents a trivalent substituent.

8. The inkjet recording method according to claim 6, wherein the sulfoxide compound is methionine sulfoxide.

9. The inkjet recording method according to claim 6, wherein the silane coupling layer is formed with a silane coupling agent containing a fluorine atom, and the silane coupling layer is formed on a surface of a nozzle plate of an inkjet head in the inkjet printer.

10. The inkjet recording method according to claim 6, wherein the inkjet recording medium on which the image is recorded comprises a support and an ink-receiving layer that contains inorganic pigment particles and is formed on the support.

* * * * *